United States Patent
Chen et al.

(10) Patent No.: US 11,788,843 B2
(45) Date of Patent: Oct. 17, 2023

(54) DETERMINING THE LOCATION OF A MOBILE DEVICE

(71) Applicant: Oxford University Innovation Limited, Oxford (GB)

(72) Inventors: Changhao Chen, Oxford (GB); Ronald Clark, Oxford (GB); Andrew Markham, Oxford (GB); Agathoniki Trigoni, Oxford (GB)

(73) Assignee: OXFORD UNIVERSITY INNOVATION LIMITED, Oxford (GB)

(*) Notice: Subject to any disclaimer, the term of this patent is extended or adjusted under 35 U.S.C. 154(b) by 558 days.

(21) Appl. No.: 16/960,693

(22) PCT Filed: Jan. 10, 2019

(86) PCT No.: PCT/GB2019/050056
§ 371 (c)(1),
(2) Date: Jul. 8, 2020

(87) PCT Pub. No.: WO2019/138225
PCT Pub. Date: Jul. 18, 2019

(65) Prior Publication Data
US 2020/0355503 A1    Nov. 12, 2020

(30) Foreign Application Priority Data

Jan. 10, 2018 (GR) ............................... 20180100008
Mar. 14, 2018 (GB) ..................................... 1804079

(51) Int. Cl.
G01C 21/16     (2006.01)
G01C 19/00     (2013.01)
(Continued)

(52) U.S. Cl.
CPC ............ *G01C 21/185* (2020.08); *G01C 19/00* (2013.01); *G01C 21/206* (2013.01); *G01P 15/08* (2013.01)

(58) Field of Classification Search
CPC .... G01C 21/185; G01C 19/00; G01C 21/206; G01C 22/006; G01C 21/16; G01C 21/00; G01P 15/08
See application file for complete search history.

(56) References Cited

U.S. PATENT DOCUMENTS 8,688,375 B2 * 4/2014 Funk ....................... G01S 19/49
340/995.19
8,712,686 B2 * 4/2014 Bandyopadhyay ... G01S 5/0294
701/445
(Continued)

FOREIGN PATENT DOCUMENTS

AU    2013274610 B2 * 12/2015    ............. G01C 21/00
CN    105116431 A    * 12/2015
(Continued)

OTHER PUBLICATIONS

International Search Report and Written Opinion for PCT/GB2019/050056, dated Apr. 12, 2019, pp. 1-13.
(Continued)

*Primary Examiner* — Adam R Mott
*Assistant Examiner* — Heather J Keniry
(74) *Attorney, Agent, or Firm* — Thomas|Horstemeyer, LLP

(57) ABSTRACT

A computer-implemented method of determining a location of a mobile device is provided. The method can include receiving inertial data generated at the mobile device, the inertial data including a plurality of samples taken at different times, segmenting the inertial data into pseudo-independent windows, wherein each pseudo-independent window can include a plurality of the samples and wherein one
(Continued)

or more initial states for each pseudo-independent window are treated as unknown, estimating a change in navigation state over each pseudo-independent window using the samples of inertial data, and summing the changes in the navigation states over the pseudo-independent windows so as to determine the location of the mobile device.

23 Claims, 20 Drawing Sheets

(51) Int. Cl.
  *G01P 15/08* (2006.01)
  *G01C 22/00* (2006.01)
  *G01C 21/20* (2006.01)

(56) References Cited

U.S. PATENT DOCUMENTS

| | | | |
|---|---|---|---|
| 9,730,029 B2 * | 8/2017 | Choudhury | H04W 4/029 |
| 10,145,962 B1 * | 12/2018 | Nikkhah | G01S 19/396 |
| 2012/0072166 A1 * | 3/2012 | Keal | G01C 21/165 |
| | | | 706/12 |
| 2013/0311133 A1 * | 11/2013 | Kordari | G01C 25/005 |
| | | | 702/160 |
| 2015/0316383 A1 * | 11/2015 | Donikian | G06V 40/20 |
| | | | 701/408 |
| 2018/0284802 A1 * | 10/2018 | Tsai | G05D 1/027 |

FOREIGN PATENT DOCUMENTS

| | | |
|---|---|---|
| CN | 106 643 715 A | 5/2017 |
| EP | 2 995 949 A1 | 3/2016 |
| JP | 2001238681 A | 4/2001 |
| WO | 2015/091113 A2 | 9/2005 |
| WO | WO-2005091113 A2 * | 9/2005 ........... G01C 21/165 |
| WO | 2011/159572 A2 | 12/2011 |
| WO | WO-2013188245 A1 * | 12/2013 ............ G01C 21/00 |
| WO | 2014/186782 A2 | 11/2014 |
| WO | 2018/134587 A1 | 7/2018 |
| WO | 2018/134589 A1 | 7/2018 |

OTHER PUBLICATIONS

UK Search Report for GB 1804079.0, dated Sep. 17, 2018, pp. 1-4.
Hang Yan et al: "RID !: Robust IMU Double Integration : 15th European Conference, Munich, Germany, Sep. 8-14, 2018, Proceedings, Part XIII" In: "Serious Games", Dec. 31, 2017 (Dec. 31, 2017), Springer International Publishing, Cham 032682, XP055568708, ISSN: 0302-9743 ISBN: 978-3-642-38979-5 vol. 11217, pp. 641-656.
Changhao Chen et al: "IONet: Learning to Cure the Curse of Drift in Inertial Odometry", Jan. 30, 2018 (Jan. 30, 2018), XP055568599, Thirty-Second AAAI Conference on Artificial Intelligence.
"DeepVO: Towards End-to-End Visual Odometry with Deep Recurrent Convolutional Neural Networks", Sen Wang, Ronald Clark, Hongkai Wen and Niki Trigoni, 2017 IEEE International Conference on Robotics and Automation (ICRA) Singapore, May 29-Jun. 3, 2017.
"End-to-end, sequence-to-sequence probabilistic visual odometry through deep neural networks", Sen Wang, Ronald Clark, Hongkai Wen and Niki Trigoni, The International Journal of Robotics Research2018, vol. 37 (4-5) 513-542© The Author(s) 2017 Reprints and permissions:sagepub.co.uk/journalsPermissions.nav DOI: 10.1177/ 0278364917734298 journals.sagepub.com/home/ijr.
"VINet: Visual-Inertial Odometry as a Sequence-to-Sequence Learning Problem", Ronald Clark, Sen Wang, Hongkai Wen, Andrew Markham and Niki Trigoni, Department of Computer Science, University of Oxford, United Kingdom, Department of Computer Science, University of Warwick, United Kingdom, Apr. 2, 2017.

* cited by examiner

DETERMINING THE LOCATION OF A MOBILE DEVICE

CROSS-REFERENCE TO RELATED APPLICATIONS

This application is the National Stage of International Application No. PCT/GB2019/050056, filed Jan. 10, 2019, which claims priority to GR 20180100008, filed Jan. 10, 2018 and GB 1804079.0, filed Mar. 14, 2018, which are entirely incorporated herein by reference.

The invention relates to a method and system for determining a location of a mobile device, and more specifically to determining the location from inertial data. In particular, the method and system may allow for more accurate location determination from inertial data, in particular when that data is provided by low-quality sensors such as inertial sensors often used in mobile phones.

Fast and accurate localisation, for example indoor localisation, is applicable to many personal applications, including smart retail, public place navigation, human-robot interaction and augmented reality. One promising approach for indoor localisation is to use inertial sensors to perform dead reckoning; this has attracted great attention from both academia and industry, because of its mobility and flexibility (Lymberopoulos et al. 2015—discussed below).

Recent advances of MEMS (Micro-Electro-Mechanical Systems) sensors enable inertial measurement units (IMUs) to be small and cheap enough to be deployed on smartphones. However, the low-cost inertial sensors on smartphones are plagued by high sensor noise, leading to unbounded system drifts.

Based on Newtonian mechanics, traditional strapdown inertial navigation systems (SINS) integrate IMU measurements directly. Such systems are hard to implement successfully with accuracy-limited IMUs due to exponential error propagation arising in the calculations (e.g. from integration).

To address these problems, step-based pedestrian dead reckoning (PDR) has been proposed.

PDR estimates trajectories by detecting steps, estimating step length and heading, and updating locations per step (Li, F.; Zhao, C.; Ding, G.; Gong, J.; Liu, C.; and Zhao, F. 2012, "*A reliable and accurate indoor localization method using phone inertial sensors*", UbiComp 12 421-430). Instead of double-integrating accelerations into locations, a step length update mitigates exponentially increasing drifts into linearly increasing drifts. However, dynamic step estimation is heavily influenced by sensor noise, a user's walking habits and phone attachment changes (e.g. handheld, in pocket, in handbag), causing unavoidable errors to the entire system (Brajdic, A., and Harle, R. 2013, "*Walk detection and step counting on unconstrained smartphones*", Ubicomp 13). In some scenarios, no steps can be detected, for example, if a phone is placed on a baby stroller or shopping trolley. In such scenarios, the assumption of periodicity which are exploited by step-based PDR break down.

Therefore, the intrinsic problems of SINS and PDR prevent widespread use of inertial localisation in daily life. The architecture of two existing methods is illustrated in FIGS. 1A and 1B, respectively.

The SINS architecture 10 shown in FIG. 1A comprises an IMU 12. The IMU 12 has accelerometers 12b and gyroscopes 12a arranged to provide inertial data. The inertial data is passed to an inertial navigation system 14. Multiple integration processes are then performed by the inertial navigation system 14 to provide the outputs 16 of position, velocity and orientation of the IMU 12.

Strapdown Inertial Navigation Systems (SINS) have been studied for decades (Savage, P. G. 1998, "*Strapdown Inertial Navigation Integration Algorithm Design Part 1: Attitude Algorithms*", Journal of Guidance, Control, and Dynamics 21(1):19-28). Previous inertial systems heavily relied on expensive, heavy, high-precision inertial measurement units, hence their main application was constrained to moving vehicles, such as automobiles, ships, aircraft, submarines and spacecraft. Recent advances of MEMS technology enable low-cost MEMS IMU to be deployed on robotics, UAV (Bloesch, M.; Omari, S.; Hutter, M.; and Siegwart, R. 2015, "*Robust visual inertial odometry using a direct EKF-based approach*", In IEEE International Conference on Intelligent Robots and Systems, volume 2015-Decem, 298-304), and mobile devices (Lymberopoulos, D.; Liu, J.; Yang, X.; Choudhury, R. R.; Handziski, V.; and Sen, S. 2015, "*A Realistic Evaluation and Comparison of Indoor Location Technologies: Experiences and Lessons Learned*", IPSN 2015 (Table 1):178-189).

In ideal conditions, traditional strapdown inertial navigation systems (SINS—FIG. 1A) can estimate system states for all future times. High-precision INS in aviation and marine applications uses highly accurate sensors to keep measurement errors small. They require a time-consuming system initialisation including sensor calibration and orientation initialisation. However, these requirements are inappropriate for pedestrian tracking and similar applications.

Realising SINS mechanism on low-cost MEMS IMU platform therefore suffers from the following two problems:

The measurements from IMUs embedded in consumer phones are corrupted by various error sources, such as scale factor, axis misalignment, thermo-mechanical white noise and random walking noise (Naser, El-Sheimy; Haiying, H. X. N. 2008, "*Analysis and Modeling of Inertial Sensors Using Allan Variance*", IEEE TRANSACTIONS ON INSTRUMENTATION AND MEASUREMENT 57(JANUARY):684-694). From attitude update to location update, the INS algorithm sees a triple integration from raw data to locations. Even a tiny noise is therefore exaggerated through this open-loop integration, potentially causing systems to collapse within seconds.

A time-consuming initialisation process is not suitable for everyday usage, especially for orientation initialisation. Even small orientation errors would lead to an incorrect projection of the gravitational acceleration vector on the x, y axes. For example, a 1 degree attitude error will cause an additional 0.1712 m/s$^2$ acceleration on the horizontal plane, leading to 1.7 m/s velocity error and 8.56 m location error within 10 seconds.

However, restricted by size and cost, the accuracy of a MEMS IMU is limited, and it has to be integrated with other sensors in order to achieve acceptable accuracy, for example visual inertial odometry (Leutenegger, S.; Lynen, S.; Bosse, M.; Siegwart, R.; and Furgale, P. 2015, "*Keyframe-based visualinertial Odometry using nonlinear optimization*", The International Journal of Robotics Research 34(3):314-334).

Another solution is to attach an IMU to a user's foot in order to take advantage of heel strikes for zero-velocity update to compensate system error drifts (Skog, I.; Handel, P.; Nilsson, J.-O.; and Rantakokko, J. 2010, "*Zero-velocity detection an algorithm evaluation*", IEEE transactions on bio-medical engineering 57(11):2657-2666). These inconveniences prevent inertial solution on consumer grade devices (Harle 2013—details above).

The PDR architecture 20 shown in FIG. 1B comprises an IMU 22. The IMU 22 has at least one accelerometer 22b and at least one gyroscope 22a to provide inertial data. The inertial data is then passed to a processor 24 which is arranged to detect the number of steps taken and estimate heading and step length. A personal step model of a user's gait may be used. The processor provides position updates 26 as an output.

Unlike SINS's open-loop integration of inertial sensors, PDR uses inertial measurements to detect step, estimate stride length and heading via empirical formula (Shu, Y.; Shin, K. G.; He, T.; and Chen, J. 2015, *"Last-Mile Navigation Using Smartphones"*, In Proceedings of the 21st Annual International Conference on Mobile Computing and Networking, MobiCom, 512-524). System errors still quickly accumulate, because of incorrect step displacement segmentation and inaccurate stride estimation. In addition, a large number of parameters have to be carefully tuned according to each specific users' walking habits to obtain acceptable accuracy.

Recent research mainly focused on fusing PDR with external references, such as floor plan (Xiao, Z.; Wen, H.; Markham, A.; and Trigoni, N. 2014, *"Lightweight map matching for indoor localization using conditional random fields"*, 2014 International Conference on Information Processing in Sensor Networks, IPSN 2014 131-142), WiFi fingerprinting (Hilsenbeck, S.; Bobkov, D.; Schroth, G.; Huitl, R.; and Steinbach, E. 2014, *"Graph-based Data Fusion of Pedometer and WiFi Measurements for Mobile Indoor Positioning"*, UbiComp 14 147-158) and magnetic field (Wang, S.; Wen, H.; Clark, R.; and Trigoni, N. 2016, *"Keyframe based Large-Scale Indoor Localisation using Geomagnetic Field and Motion Pattern"*, In IEEE/RSJ International Conference on Intelligent Robots and Systems (IROS), 1910-1917), still leaving fundamental problems unsolved.

According to a first aspect of the invention, there is provided a computer-implemented method of determining a location of a mobile device, the method comprising one or more of the following steps:
  (i) receiving inertial data generated at the mobile device, the inertial data comprising a plurality of samples taken at different times;
  (ii) segmenting the inertial data into pseudo-independent windows, wherein each pseudo-independent window comprises a plurality of the samples and wherein one or more initial states for each pseudo-independent window are treated as unknown;
  (iii) estimating a change in navigation state over each pseudo-independent window using the samples of inertial data; and
  (iv) summing the changes in the navigation states over the pseudo-independent windows so as to determine the location of the mobile device.

The only sensor data used in estimating change in navigation state over each pseudo-independent window may be inertial data.

The change in navigation state over each pseudo-independent window may be estimated using only the samples of inertial data. In some embodiments, no values for latent or initial states may be propagated between windows (i.e. all initial states present may be treated as unknown).

At least one of, and optionally both of, values for gravity vector and velocity of the mobile device may not be estimated and/or may not be propagated as initial states for the windows.

An initial position of the mobile device may be set as an origin. The determined location may be defined relative to that origin. In some embodiments, the origin may then be aligned with a reference, e.g. with Global Positioning System (GPS) data, user input, or the likes. In some embodiments, a relative position/trajectory may be sufficient, with no global localisation. No external input on location is therefore required in many embodiments.

Values for device orientation may not be estimated and may not be propagated as an initial state for the windows.

The one or more initial states treated as unknown may include at least one of initial velocity state in a device body frame, gravity vector in the device body frame, or device pose (position and attitude) in a navigation frame. The one or more initial states treated as unknown may include both initial velocity state in a device body frame and gravity vector in the device body frame.

The estimating the change in navigation state over each pseudo-independent window may be performed independently for each window, without requiring provision of one or more initial states (e.g. position, velocity) for one window from the preceding window. In some embodiments, no initial states from the preceding window may be provided to the following window.

Initial velocity and gravity vector in a device body frame states may be unknown, and may not be passed to subsequent windows as input. The initial velocity and the gravity vector in the device body frame states may not be explicitly calculated.

A regressor such as a neural network or a genetic algorithm may be used to estimate some representation of the initial velocity and the gravity vector implicitly encoded in latent features. The regressor may extract the latent features from the inertial data. The regressor may be used to learn a relationship between the inertial data of the samples and the change in navigation state.

The inertial data may comprise at least one of acceleration and gyroscope data.

The change in navigation state may comprise a current displacement expressing the horizontal distance traveled in the current window and an angular change expressing the angle between the current displacement and the displacement in the previous window.

The method may comprise only one explicit integrator, the integrator being present in the summing step. The integrator may integrate a sequence of (displacement, angle) pairs, or other representations of change in location for each window, into a trajectory.

Each pseudo-independent window may comprise around 200 samples.

Around one hundred samples may be taken per second (i.e. a data sampling rate of around 100 Hz)

A bidirectional architecture may be adopted to exploit dynamic context in that prior and subsequent samples around a selected sample may be used to update the impact of the selected sample.

The inertial data may comprise IMU data from a smartphone or other IMU device.

Sensor measurements from each sample within a window may be mapped to polar displacements over that window. The sensor may be or comprise one or more accelerometers and/or gyroscopes.

The change in navigation state over each pseudo-independent window may be provided as a delta vector. The delta vectors may be what is summed.

According to a second aspect of the invention, there is provided a mobile device arranged to determine its location, the mobile device comprising at least one of the following:

an inertial measurement unit (IMU) arranged to generate inertial data, the inertial data comprising a plurality of samples taken at different times; and processing circuitry arranged to generate at least one of the following:

segments of the inertial data corresponding to pseudo-independent windows (a segmentation of the inertial data into pseudo-independent windows), wherein each pseudo-independent window comprises a plurality of the samples and wherein one or more initial states for each pseudo-independent window are treated as unknown;

estimates of a change in navigation state over each pseudo-independent window using the samples of inertial data; and sums of the changes in the navigation state over the pseudo-independent windows so as to determine the location of the mobile device.

The mobile device may be arranged to perform the method as described for any embodiment of the first aspect of the invention.

For example, the only sensor data used in estimating change in navigation state over each pseudo-independent window may be inertial data (unlike visual-inertial Odometry which additionally uses visual data from a sensor such as a camera), and optionally the change in navigation state over each pseudo-independent window may be estimated using only the samples of inertial data.

The processing circuitry may be arranged to generate some or all of the processing of segmentation, estimation and summing of the inertial data by transmitting data to a remote processing circuitry so that some or all of the processing may be performed remotely. Alternatively, all processing may be performed locally, at the mobile device.

According to a third aspect of the invention, there is provided a computer-readable medium containing instructions that, when read by a processing circuitry, cause that processing circuitry to implement the method of any embodiment of the first aspect of the invention.

Advantageously, the approach disclosed herein may permit a more general tracking problem to be handled, including trolley/wheeled configurations, which step-based PDR cannot address.

Advantageously, the approach disclosed herein may also reduce inertial system drifts by breaking the cycle of continuous error propagation.

The inventors appreciated that inertial tracking may be reformulated as a sequential learning problem with pseudo-independent stages.

Instead of developing multiple modules for step-based PDR, the approach disclosed herein can provide a continuous trajectory (e.g. for indoor users) from raw data without the need of any hand-engineering (e.g. tailoring to a specific user's gait—for techniques like PDR, hand-engineering or "tweaking" of parameters such as step-length, thresholds for step detection, relationships between height and stride, relationships between speed and stride, and tricks for disambiguating true steps from movements, such as hand-waving, which appear like steps is required for accuracy. The challenges of PDR often include that the IMU is not mounted on the foot, so the motion observed is a combination of locomotion and other activities).

The approach disclosed herein re-casts the inertial tracking problem as a sequential learning approach by deriving a sequence-based physical model from Newtonian mechanics.

Extensive experiments across different attachments, users, devices and environments demonstrated that results can outperform traditional SINS and PDR mechanisms. In addition, it has been demonstrated that the approach disclosed herein can be generalised to a more general motion without the regular periodicity of walking, e.g. for an IMU on a trolley or other wheeled configurations.

In various embodiments, a neural network is used as part of the implementation. In alternative or additional embodiments, a genetic algorithm or the likes may be used as well as or instead of a neural network.

The skilled person will appreciate that, if an alternative to a neural network is used, the sequential learning problem approach with pseudo-independent stages is generally still applicable. Each stage (window) is treated as independent of the/any prior and subsequent windows. The skilled person would appreciate that any general purpose regression which can transform a series of IMU readings into a vector (e.g. a polar vector) representing displacement and delta heading could be used—such a vector may be referred to as a delta vector. Regressions tested by the inventors include the conventional feedforward neural networks (e.g. a cony-net which takes in all samples at once) and recurrent neural networks (which ingest one sample at a time). However, both networks are bounded to operate over one window to prevent drift accumulation. Any generic regression could be used. Genetic algorithms or shallow regressors (e.g. random forests) or the likes could also be exploited. Genetic algorithms can be used to stochastically search the parameter space for a generic non-linear regressor. Genetic programming can be used to search the function space of non-linear regressors and find good mapping functions. Approximate Bayesian Computation techniques could also be used.

The inventors believe that the embodiments described in detail herein demonstrate the first deep neural network (DNN) framework that learns location transforms from raw IMU data, and constructs inertial odometry regardless of IMU attachment. In the embodiments described, the framework learns location transforms primarily, and optionally solely, from raw IMU data. In particular, combination of inertial data with visual data is not required. Polar coordinates are used for convenience in the embodiments described, but the skilled person will appreciate that alternative coordinate systems could be used.

Sequential Deep Learning approaches have recently been shown to have excellent performance in handling sequence data, such as speech recognition (Graves, A., and Jaitly, N. 2014, "Towards End-to-End Speech Recognition with Recurrent Neural Networks", Proceedings of the 31st International Conference on Machine Learning (ICML) 32(1): 17641772), machine translation (Dai, A. M., and Le, Q. V. 2015, "Semi-supervised Sequence Learning", In Advances in Neural Information Processing Systems (NIPS 2015), 30793087), visual tracking (Ondruska, P., and Posner, I. 2016, "Deep Tracking: Seeing Beyond Seeing Using Recurrent Neural Networks", In Proceedings of the Thirtieth AAAI Conference on Artificial Intelligence (AAAI-16), 3361-3367) and video description (Donahue, J.; Hendricks, L. A.; Guadarrama, S.; Rohrbach, M.; Venugopalan, S.; Darrell, T.; and Saenko, K. 2015, "Long-term recurrent convolutional networks for visual recognition and description", Proceedings of the IEEE Computer Society Conference on Computer Vision and Pattern Recognition 07-12-June:2625-2634). However, use of a neural network framework to achieve inertial odometry using inertial data only is not known in the prior art.

Previous learning-based work has been focused on solving localisation problems by realising visual odometry (Zhou, T.; Brown, M.; Snavely, N.; and Lowe, D. G. 2017, *"Unsupervised Learning of Depth and Ego Motion from Video"*, CVPR 2017) and visual inertial odometry (Clark, R.; Wang, S.; Wen, H.; Markham, A.; and Trigoni, N. 2017, *"VINet: Visual-Inertial Odometry as a Sequence-to-Sequence Learning Problem"*, AAAI 3995-4001). Some other work concentrated on learning intuitive physics (Hooman, J.; Roever, W.-p. D.; Pandya, P.; Xu, Q.: Zhou, P.; and Schepers, H. 2017, *"A Compositional Object-Based Approach to Learning Physical Dynamics"*, ICLR 1:155-173), modelling state space models (Karl, M.; Soelch, M.; Bayer, J.; and van der Smagt, P. 2016, *"Deep Variational Bayes Filters: Unsupervised Learning of State Space Models from Raw Data"*, Proceedings of the Intuitive Physics Workshop at NIPS 2016 (i):2-5), and supervising neural networks via physics knowledge (Stewart, R., and Ermon, S. 2017, *"Label-Free Supervision of Neural Networks with Physics and Domain Knowledge"*, AAAI 2017 1(1):1-7.). While most of these prior art approaches use visual observations, the approach disclosed herein exploits real world motion measurements to learn high-level movement, without any need for visual observations.

The skilled person will appreciate that features described with respect to one embodiment may be applied to any other embodiment, mutatis mutandis.

There now follows by way of example only a detailed description of non-limiting embodiments of the present invention with reference to the accompanying drawings in which.

Figure 1A:
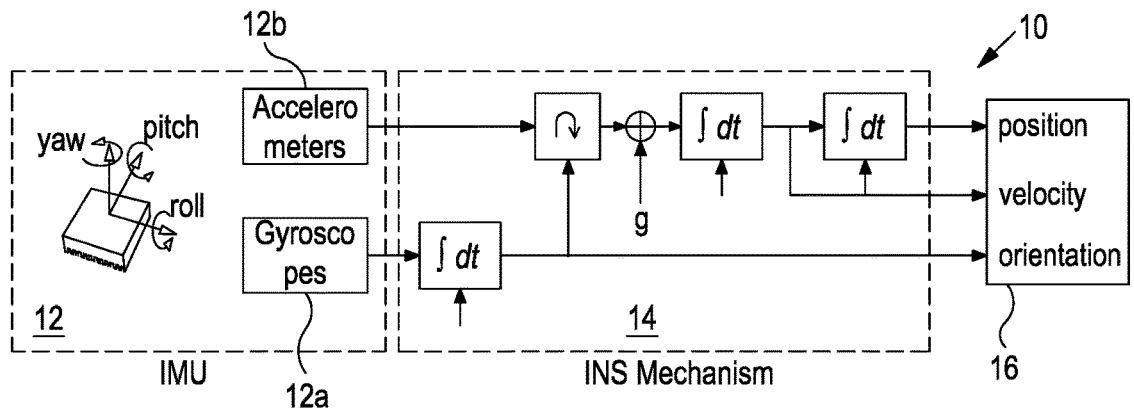
FIG. 1A (PRIOR ART) shows an architecture of a strapdown inertial navigation system.
Figure 1B:
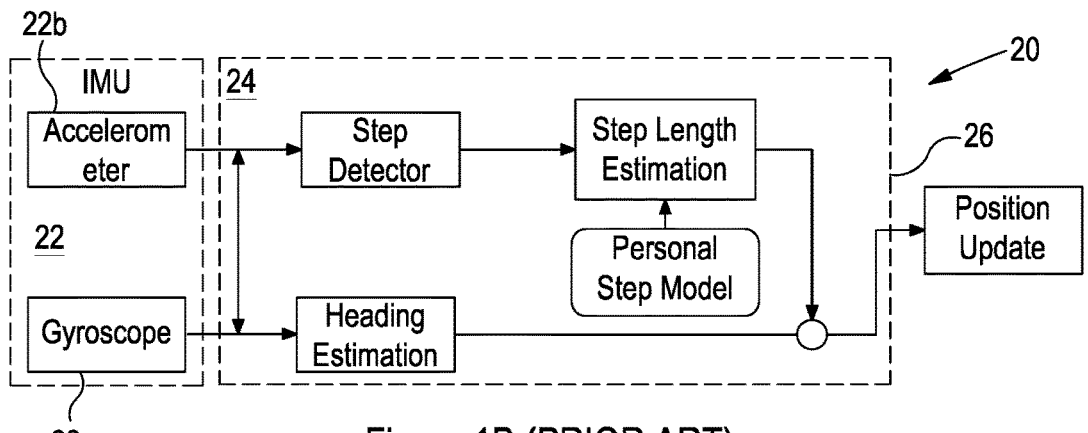
FIG. 1B (PRIOR ART) shows an architecture of a pedestrian dead reckoning system.
Figure 1C:
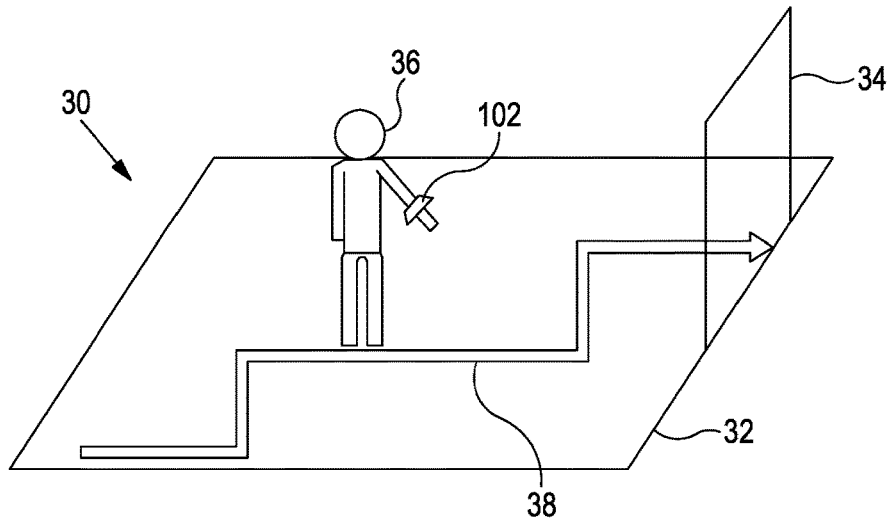
FIG. 1C illustrates a mobile device being moved along a trajectory, as applicable to both the prior art and embodiments of the present invention.

FIG. 1C illustrates an environment 30 within a room 32 of a building. The room 32 has one door 34 shown.

A person 36 moves through the environment 30 along a trajectory 38.

The person 36 is carrying a mobile device 102, in this case a smartphone. In alternative embodiments, the mobile device 102 may be in or on clothing (e.g. in a pocket), worn (e.g. a smart watch), in a bag, or on a trolley or the likes, instead of being handheld. In some embodiments, the mobile device may be autonomous, such as a robot or the like. However, for the sake of convenience the following description makes reference to a 'person' but the skilled person will appreciate the wider meaning.

The mobile device 102 comprises one or more gyroscopes 102a and one or more accelerometers 102b, and can therefore function as an Inertial Measurement Unit (IMU). The mobile device 102 further comprises processing circuitry 102c in communication with the accelerometer(s) and gyroscope(s).

Conveniently, the processing circuitry is arranged, likely via programming, to perform the embodiments described herein. However, it is conceivable that some embodiments may be arranged to transmit data to a processing circuitry remote from the mobile device wherein at least some portions of the embodiment are performed remote from the mobile device 102.

The mobile device 102 is arranged to implement a method of an embodiment of the invention—in particular to determine a location of the mobile device 102. The skilled person will appreciate that repeated location determinations with time as the person 36 moves through the environment 30 allow an estimate of the trajectory 38 to be determined.

The mobile device 102 can therefore be used to determine a location and/or a trajectory of the person 36. As noted above, the skilled person would appreciate that the mobile device 102 could move itself, and/or could be attached to an animal, robot, vehicle or the likes instead of a person 36.

The functioning of the mobile device 102 is described in more detail below.

The skilled person will appreciate that principles of inertial navigation are based on Newtonian mechanics. They allow tracking the position and orientation of an object in a navigation frame (i.e. the rest frame of the room 32 in the example shown in FIG. 1C) given initial pose and measurements from accelerometers and gyroscopes.

FIGS. 1A and 1B illustrate the basic mechanism of inertial navigation algorithms. The three-axis gyroscope 12a, 22a measures angular velocities of body frame (i.e. the rest frame of the mobile device 102 in the example shown in FIG. 1C, also referred to as device body frame) with respect to the navigation frame, which are integrated into pose attitudes in Equations (1)-(3), below.

To specify the orientation, direction cosine $C_b^n$ is used to represent transformation from the body (b) frame to the navigation (n) frame, and is updated with a relative rotation matrix $\Omega(t)$. The 3-axis accelerometer 12b, 22b measures proper acceleration vectors in body frame. The acceleration vectors are first transformed to the navigation frame and then integrated into velocity, discarding the contribution of gravity forces g in Equation (4). The locations are updated by integrating velocity in Equation (5). Equations (1-5) describe the attitude, velocity and location update at any time stamp t.

In the embodiments described herein, the effects of earth's rotation and Coriolis accelerations are ignored. The skilled person would appreciate that these effects could be included in other embodiments.

Attitude Update:

$$C_b^n(t) = C_b^n(t-1)C_b^n(t-1)*\Omega(t) \qquad (1)$$

$$\sigma = w(t)dt \qquad (2)$$

$$\Omega(t) = C_{b_t}^{b_{t-1}} = I + \frac{\sin(\sigma)}{\sigma}[\sigma\times] + \frac{1-\cos(\sigma)}{\sigma^2}[\sigma\times]^2 \qquad (3)$$

Velocity update:

$$v(t) = v(t-1) + ((C_b^n(t-1))*a(t) - g_n)dt \qquad (4)$$

Location update:

$$L(t) = L(t-1) + v(t-1)dt \qquad (5)$$

where a and w are accelerations and angular velocities in body frame measured by an IMU 102, v and L are velocities and locations in navigation frame, and g is acceleration due to gravity.

The approach disclosed herein, in relation to at least some embodiments, breaks the cycle of continuous integration by segmenting inertial data into (pseudo-)independent windows which has the advantage of at least ameliorating error propagation. Each window includes one or more samples of inertial data, each sample taken at a known time (the time may be known relative to the previous sample only in some cases, rather than relative to a more general reference). In the embodiment being described, the samples within each window are consecutive, covering a certain time period. In these embodiments, the preceding window contains consecutive samples from a consecutive earlier time period, and the following window contains consecutive samples from a consecutive later time period. In the embodiments being described, the time period covered by a window is the same for each window, and the number of samples is the same for each window. In alternative or additional embodiments, window length and/or number of samples per window may vary.

Figure 2:
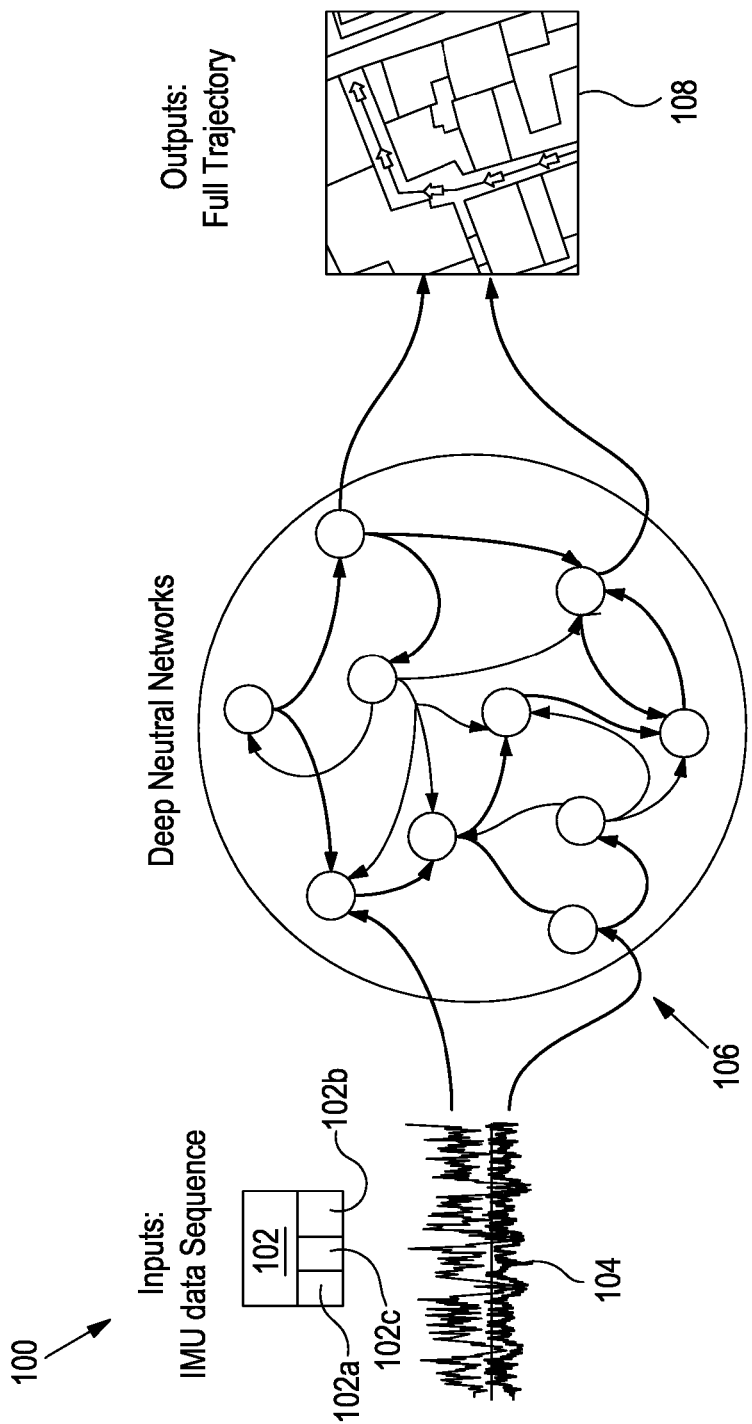
FIG. 2 shows a schematic representation of a learning-based method of an embodiment of the invention.

FIG. 2 illustrates an approach 100 suitable for being implemented by a mobile device 102 containing an IMU.

In the embodiment being described, an IMU data sequence 104 from the mobile device 102 is fed to a deep neural network 106. In alternative embodiments, a neural network may not be used—a genetic algorithm and/or other processing may be used instead (or as well), as discussed above. The output is one or more location estimates 108 for the mobile device 102; the skilled person will appreciate that multiple sequential location estimates provide a trajectory 108.

However, windowed inertial data is not automatically independent, as Equations (1-5) demonstrate.

This is because key states (namely initial attitude, velocity and location) are unobservable—they have to be derived from previous system states and inertial measurements, and propagated across time. Unfortunately, errors are also propagated across time, "cursing" inertial odometry.

It is generally impossible for windows to be truly independent. However, the approach disclosed herein allows pseudo-independence of windows—the change in navigation state over each window is estimated without initialisation based on the previous window. By accumulating the delta-states using a simple summation, there is only one explicit integrator in the formulation. The skilled person will appreciate that error propagation can therefore be reduced.

Embodiments can then consider how to constrain or estimate these unobservable states over a window. Following this idea, a novel sequence-based physical model approach is determined, based on the Newtonian Laws of Motion.

In the main embodiments being described, this model is then reformulated as a learning model. The learning model is suitable for use with neural networks 106, or with various regressors. In alternative embodiments, different processing methods may be used with the model so avoiding the need for a neural network—for example, genetic algorithms may be used as mentioned above. Implementation is therefore independent of the implementation method, and in particular is not dependent on neural networks.

The unobservable or latent system states of an inertial system consist of orientation $C_b^n$, velocity v and position L. In a traditional model, the transformation of system states could be expressed as a transfer function/state space model between two time frames as shown in Equation (6), and the system states are directly coupled with each other.

$$[C_b^n vL]_t = f([C_b^n vL]_{t-1}, [aw]_t) \qquad (6)$$

Displacement is considered first. To separate the displacement of a window from the prior window, the change in displacement $\Delta L$ over an independent window of n time samples is computed (in the embodiment being described, the samples are consecutive). This gives:

$$\Delta L = \int_{t=0}^{n-1} v(t)dt \qquad (7)$$

$\Delta L$ can then be separated out into a contribution from the initial velocity state, and the accelerations in the navigation frame:

$$\Delta L = nv(0)dt + [(n-1)s_1 + (n-2)s_2 + \ldots + s_{n-1}]dt^2 \qquad (8)$$

where s(t) is the acceleration in the navigation frame, comprising a dynamic part and a constant part due to gravity, is:

$$s(t) = C_b^n(t-1)a(t) - g \qquad (9)$$

Then, Equation (8) can be further formulated as:

$$\Delta L = nv(0)dt + \left[(n-1)C_b^n(0)*a_1 + (n-2)C_b^n(0)\Omega(1)*a_2 + \ldots + C_b^n(0)\prod_{i=1}^{n-2}\Omega(i)*a_{n-1}\right]dt^2 - \frac{n(n-1)}{2}gdt^2 \qquad (10)$$

and simplified to become:

$$\Delta L = nv(0)dt + C_b^n(0)Tdt^2 - \frac{n(n-1)}{2}gdt^2 \qquad (11)$$

where $$T = (n-1)a_1 + (n-2)\Omega(1)a_2 + \ldots + \prod_{i=1}^{n-2}\Omega(i)a_{n-1} \qquad (12)$$

In some embodiments, the problem of indoor positioning is considered; i.e. tracking objects and people on a horizontal plane. This introduces a simplifying observation: in the navigation frame, there is no long-term change in height (this assumption can be relaxed in other embodiments, for example through the use of additional sensor modalities such as a barometer to detect changes in floor level due to stairs or elevator).

In such embodiments, this means that the mean displacement in the z axis over a window can be assumed to be zero and thus can be removed from the formulation.

In alternative or additional embodiments, this assumption can be relaxed, for example through the use of additional sensor modalities such as a barometer to detect changes in floor level due to stairs or elevator. The skilled person will appreciate that other embodiments disclosed herein may include movement in three dimensions, and so not discount vertical movement/acceleration, but that limiting the scope to movement in a plane may help to reduce the dimensionality of the problem, making it more amenable to training.

In the embodiments described herein, the absolute change in distance over a window can be computed as the L-2 norm i.e. $\Delta l = \|\Delta L\|_2$, effectively decoupling the distance traveled from the orientation (bearing/heading) traveled in, leading to:

$$\Delta l = \left\|nv(0)dt + C_b^n(0)Tdt^2 - \frac{n(n-1)}{2}gdt^2\right\|_2 = \left\|C_b^n(0)\left(nv^b(0)dt + Tdt^2 - \frac{n(n-1)}{2}g_0^b dt^2\right)\right\|_2 \qquad (13)$$

As the rotation matrix $C_b^n(0)$ is an orthogonal matrix i.e. $C_b^n(0)^T C_b^n(0) = I$, the initial unknown orientation has been successfully removed from the expression, giving:

$$\Delta l = \|\Delta L\|_2 = \left\|nv^b(0)dt + Tdt^2 - \frac{n(n-1)}{2}g_0^b dt^2\right\|_2 \qquad (14)$$

Hence, over a window, the horizontal distance traveled, or displacement ($\Delta l$), can be expressed as a function of the initial velocity and gravity, as well as the linear and angular acceleration data during the time window, all in the body frame:

$$\Delta l = f(v^b(0), g_0^b, a_{1:n}, w_{1:n}) \qquad (15)$$

In order to estimate the motion of the device using polar coordinates, the angular change $\Delta\psi$ associated with the displacement is determined. The angular change can also be expressed as a function of the initial velocity and gravity, as well as the linear and angular acceleration data during the time window, all in the body frame.

To determine the change in the user's heading, it is considered that a user's real accelerations and angular rates ($a_{1:n}$, $w_{1:n}$) are also latent variables of IMU raw measurements ($\hat{a}_{1:n}$, $\hat{w}_{1:n}$) and on the horizontal plane, only the heading attitude is used in embodiments using the assumption of movement in a horizontal plane. The skilled person will appreciate that, rather than the full pose (pitch, roll, yaw), if it is assumed that users are constrained to move in the horizontal plane, then the yaw (heading) angle is of greater importance and it may be possible to ignore the roll and/or pitch. However, the approach may be used to learn the full 6DOF (Degrees Of Freedom) transformation across a window in other embodiments.

Therefore, the traditional model is reformulated as a model (in this case a polar vector ($\Delta l$, $\Delta\psi$) based model), which is only dependent on inertial sensor data, and the initial velocity and gravity in the body frame:

$$(\Delta l, \Delta\psi) = f_\theta(v^b(0), g_0^b, \hat{a}_{1:n}, \hat{w}_{1:n}) \qquad (16)$$

To derive a global location, the starting location ($x_0$; $y_0$) and heading $\psi_0$ and the Cartesian projection of a number of windows can be written as:

$$\begin{cases} x_n = x_0 + \Delta l \cos(\psi_0 + \Delta\psi) \\ y_n = y_0 + \Delta l \sin(\psi_0 + \Delta\psi) \end{cases} \qquad (17)$$

Instead of triple integration of the raw data every time step, as is done in the prior art, the approach disclosed herein updates location over a window, reducing the rate of error propagation.

It has been demonstrated that by expressing the change of distance and heading as described above, the only unknown latent state remains the initial velocity of the window. In the embodiments being described, initial position is handled by assuming the user starts from the "origin" (0,0), like most inertial positioning systems. With the aid of secondary information (e.g. a map, or human input) the origin can then be placed within a global navigation frame. Global localisation is not necessary in all applications; for example simply knowing the shape of a trajectory, or if a user has moved more than x metres from another point, can be helpful.

Embodiments described herein do not need to know, and may not know, initial position at the starting point (nor for initiation of any window) in any external reference frame, as a relative trajectory can be estimated from an arbitrary starting point. Similarly, initial device orientation and initial velocity (at the starting point or for any given window) are not needed. These data are not required to estimate heading and displacement using the approach described herein. Instead some representation of this information is implicitly encoded in the latent features extracted by the system in the embodiments being described—these initial states are therefore treated as unknown and values for them are not required, and so are generally not calculated.

The task then becomes how to implicitly estimate this initial velocity and the gravity in the body frame. In the embodiments being described, this is done by casting each window as a sequence learning problem.

In the above, displacements and heading changes are represented in the form of polar vectors. The skilled person will appreciate that this notation is used for convenience only (to separate displacement and change in motion heading), and that any other coordinate system could be used instead (e.g. Cartesian coordinates). In 3D, polar coordinates (polar vector) can be easily replaced with spherical coordinates.

Implementation details of an embodiment using a deep neural network framework are discussed in the following section. The skilled person will appreciate that this implementation is simply an example amongst many possible implementations and that other implementations could be used based on the model and pseudo-independence described above.

Estimating the initial velocity and the gravity in the body frame for each window explicitly using traditional techniques is a challenge. Rather than trying to determine the velocity, the embodiment being described instead treats Equation (16) as a sequence, where the inputs are the observed sensor data and the output is the polar vector.

In the approach disclosed herein in relation to the embodiment being described, initial velocity and gravity do not need to be provided as input, nor are they explicitly calculated. Instead some representation of this information is implicitly encoded in the latent features, which in the embodiment being described are extracted by the neural network.

In the example of pedestrian motion, the regular and constrained nature of pedestrian motion can be used to provide information about velocity. Over a window, which may be a few seconds long, a person walking at a certain rate induces a roughly sinusoidal acceleration pattern. The frequency of this sinusoid relates to the walking speed. In addition, biomechanical measurements of human motion show that as people walk faster, their strides lengthen (see Hausdorff, J. M. 2007, *"Gait dynamics, fractals and falls: Finding meaning in the stride-to-stride fluctuations of human walking"*, Human Movement Science 26(4):555-589). The skilled person will appreciate that the approach disclosed herein is applicable to any motion where patterns of motion can be extracted and related to changes in displacement, and is not limited to pedestrian motion.

Further, the gravity in the body frame can be related to the initial yaw and roll angle, determined by the attachment/placement of the device, in some embodiments, which can be estimated from the raw data (Xiao, Z.; Wen, H.; Markham, A.; and Trigoni, N. 2015, *"Robust indoor positioning with lifelong learning"*, IEEE Journal on Selected Areas in Communications 33(11):2287-2301).

The skilled person will appreciate that both velocity and gravity in the body frame are required by prior art approaches in order to estimate trajectory/location with time (e.g. polar coordinates—displacement and angular change), and are propagated between windows, but are not required by embodiments of the present invention.

Although these initial states are needed for each window in traditional models, the present approach does not require them as inputs, nor require them to be estimated as a part of the approach. The skilled person will appreciate that e.g. velocity may be a desired output in some embodiments and therefore may be estimated. However, in other embodiments, both velocity and gravity in the body frame are not provided as initialisation inputs, nor estimated at any point.

That is, in the approach disclosed herein in relation to the embodiment being described, by virtue of the pseudo-independence of the windows, only raw acceleration and gyroscope data in the body frame are used for location/trajectory estimates. In many embodiments, raw acceleration and gyroscope data (IMU data) is the only data used for trajectory estimation (with, for example, global location matching, e.g. for the origin (0,0), being an option, for example using GPS or the likes, or human input). The skilled person will appreciate that data other than IMU data may be used if global localisation is wanted.

In the approach disclosed herein, an estimate of initial velocity or of the gravity vector in the body frame is therefore not required or provided as an initial value for any window. The skilled person will appreciate that an estimate of either or both of velocity and gravity at various locations may be provided as an output, but it is not required for trajectory/location estimation using the approach of the embodiments being described.

Figure 3:
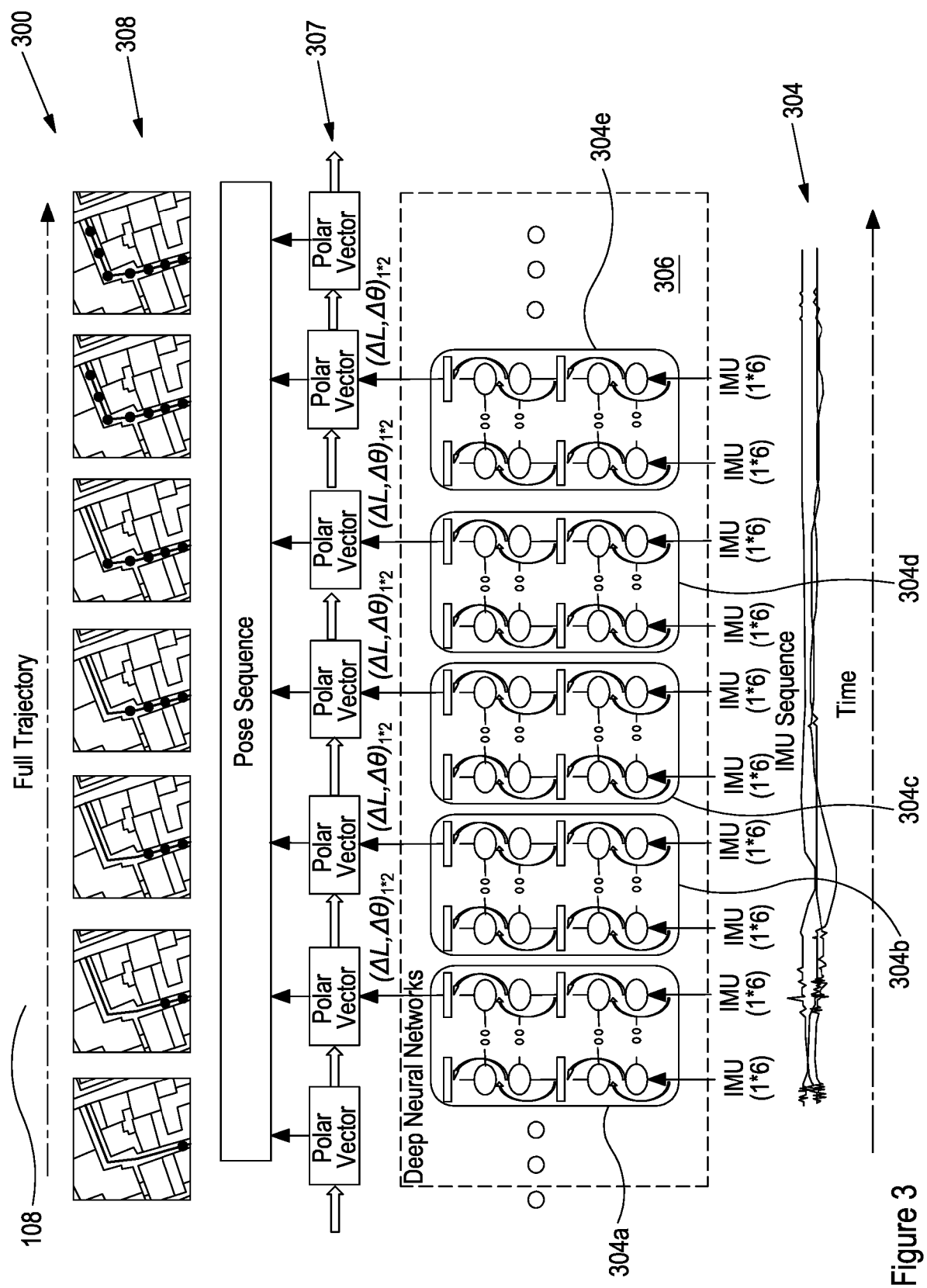
FIG. 3 shows a schematic overview of a processing framework of an embodiment of the invention.

In the embodiment being described, deep neural networks are used to learn the relationship between raw inertial (acceleration and gyroscope data) and the delta vector (in this case a polar delta vector), as illustrated in FIG. 3.

The skilled person would appreciate that this can be generalised in 3D to learning the relationship between raw inertial (acceleration and gyroscope) data and, for example, spherical coordinates or spherical polar coordinates (which is a generalisation of polar coordinates in 3D).

FIG. 3 shows an overview of a framework 300 suitable for implementing embodiments of the invention.

A sequence of data with time 304 is provided by an IMU of a mobile device 102 as an input.

In the embodiment being described, the input data 304 is provided to a deep neural network 306—in alternative or additional embodiments a different processing method may be used.

The data 304 are segmented into windows 304*a-e*. Five windows are shown in FIG. 3—the skilled person will appreciate that the number of windows can vary widely depending on the implementation.

Data for each window 304*a-e* are processed as described above so as to provide a sequence of delta vectors 307, each vector representing change within the corresponding window (shown here as polar coordinates ($\Delta L$, $\Delta \theta$), although the skilled person will appreciate that any suitable coordinate system may be used).

As a result of the approach described above, each window 304*a-e* can be treated as independent.

The delta vectors 307 are then combined to produce a pose sequence.

The output 308 is a plurality of location estimates (indicated by dots). The combination of sequential location estimates provides a trajectory (indicated by a line).

Input data 304 are provided as independent windows 304*a-e* of consecutive IMU measurements.

The IMU measurements are temporally dependent, representing body motions. To recover latent connections between motion characteristics and data features, a deep recurrent neural network (RNN) 306 is capable of exploiting these temporal dependencies by maintaining hidden states over the duration of a window 304*a-e*. Note however that latent states are not propagated between windows.

Effectively, the neural network 306 acts as a function $f_\theta$ that maps sensor measurements to polar displacement over a window:

$$(a, w)_{200*6} \overset{f_\theta}{\rightarrow} (\Delta l, \Delta\psi)_{1*2}, \tag{18}$$

where a window length of 200 samples (taken over 2 seconds—i.e. a sampling rate of 100 Hz) is used in the embodiment being described (window sizes of 50, 100, 200 and 400 samples were tested, and 200 was selected as a preferable parameter regarding the trade-off between accumulative location error and predicted loss for the embodiments tested. The skilled person will appreciate that a higher sampling frequency and/or shorter windows may be preferable in different scenarios, e.g. for faster movement of a mobile device 102, and vice versa).

The skilled person will appreciate that the choice of factors such as sampling rate, resolution etc. is guided by the application, and for example may be guided by expected speed, movement type, required accuracy and the likes. Further, the skilled person would appreciate that the approach disclosed herein is not limited only to a single IMU on a user, but could regress multiple signals from multiple IMUs, potentially yielding higher accuracy.

For example, a window may be one second in duration, and/or the sampling rate may be between 100 Hz and 300 Hz. In alternative embodiments, for example for relatively slow motion, the sampling rate may be lower, for example 10 Hz. In alternative embodiments, for example for relatively fast motion, the sampling rate may be higher, for example 500 Hz.

The skilled person will appreciate that polar coordinates (or any other 2D coordinate system used) may be replaced by spherical coordinates (or any other 3D coordinate system) in 3D tracking scenarios.

In the physical model, orientation transformations impact all subsequent outputs.

Long Short-Term Memory (LSTM) is adopted in the embodiment being described to handle the exploding and vanishing problems of vanilla RNN (i.e. a standard neural network that does not have gating), as it has a better ability to exploit the long-term dependencies (Greff, K.; Srivastava, R. K.; Koutnik, J.; Steunebrink, B. R.; and Schmidhuber, J. 2016, *"LSTM: A Search Space Odyssey"*, IEEE Transactions on Neural Networks and Learning Systems). In addition, both previous and future samples are useful in updating the current sample, so a bidirectional architecture is adopted to exploit dynamic context on both sides in the embodiment being described.

Equation (16) shows that modelling a final (in this case polar) vector requires modelling some intermediate latent variables, e.g. initial velocity. Therefore, to build up higher representation of IMU data, it is reasonable to stack 2-layer LSTM, with the output sequences of the first layer supplying the input sequences of the second layer. The second LSTM outputs one polar vector to represent the transformation relation in the processed sequence.

Each layer has nodes (represented by ellipses in FIGS. 3 and 12). Each node represents a hidden state computed by an RNN. In the embodiments shown in FIGS. 3 and 12, each ellipse represents an RNN (e.g. LSTM/GRU) node in the neural network which contains and passes forward or upward 96 hidden states. Each layer therefore has 96 hidden states in the embodiment being described. The skilled person will appreciate that different numbers of hidden states may be used in different embodiments, with 64, 96 and 128 hidden states per RNN node (ellipse in the Figures) being numbers typically chosen for efficient GPU processing. Using 96 hidden states per node was found to be preferable for the embodiment being described.

The skilled person will appreciate that a GRU is a Gated Recurrent Unit; i.e. another type of RNN which uses two gates instead of the three gates in an LSTM. The advantage of a GRU is that fewer gates means fewer parameters to learn.

In the embodiment being described, the neural network is arranged to return output not only at the end of the window, but also at points within each window. The skilled person will appreciate that this is a way of increasing the output update rate.

To increase the output data rate of polar vectors and locations, IMU measurements are divided into independent overlapping sub-windows with a stride of 10 samples (0.1 s, i.e. at a frequency of 10 Hz) in the embodiment being described. In embodiments in which $(\Delta l, \Delta\psi)$ are evaluated per window, they are generally added to the existing trajectory (typically providing one summation per window). However, in embodiments in which more than $(\Delta l, \Delta\psi)$ is generated per window, each may be added to the existing trajectory.

In alternative embodiments, the system could return an output after every sample (see FIG. 12D), after every 10 samples, or more generally, after every x samples in the window.

Effectively, outputting values within a window is a way of extending the region of support for the estimates by using a long window, but not suffering from the issues that a long window would cause in terms of high latencies.

The optimal parameter $\theta^*$ inside the proposed deep RNN architecture can be recovered by minimising a loss function on the training dataset $D=(X,Y)$. The skilled person will appreciate that $\theta^*$ is the optimal set of parameters (weights) for the RNN regressor. It can be found using stochastic gradient descent and its variants (e.g. ADAM).

$$\theta^* = \underset{\theta}{\operatorname{argmin}} \ell(f_\theta(X), Y) \tag{19}$$

The loss function, $\ell$, is defined as the sum of Euclidean distances between the ground truth $(\Delta \hat{l}, \Delta \hat{\psi})$ and estimated value $(\Delta l, \Delta\psi)$.

$$\ell = \Sigma \|\Delta \hat{l} - \Delta l\|_2^2 + \kappa \|\Delta \hat{\psi} - \Delta\psi\|_2^2 \tag{20}$$

where $\kappa$ is a factor to regulate the weights of $\Delta l$ and $\Delta\psi$.

EXPERIMENTS

Embodiments were tested in various scenarios to demonstrate their performance as compared to prior art localisation techniques.

Training Details

Dataset: In the prior art, there are no public datasets for indoor localisation using phone-based IMU. Data were collected for a pedestrian 36 walking inside a room 32 installed with an optical motion capture system (Vicon—Vicon, 2017, *"ViconMotion Capture Systems: Viconn"*), providing precise full pose reference (0.01 m for location, 0.1 degree for orientation) for ground truth pose and location of the mobile device 102 used (in this case a phone).

The training dataset generated comprises IMU data from the phone 102 in different attachments, e.g. hand-held, in pocket, in handbag, on trolley, each for 2 hours, collected using a common consumer phone—the iPhone® 7Plus.

Note that all of the training data used in the experiments described was collected by one person 36, User 1, carrying an iPhone® 7. To test the ability of the approach to generalise to conditions not in the training data, location estimates were then generated for three new participants and two other phones (iPhone® 6 and iPhone® 5) using the neural network 306 trained on the training data.

Training: For the experiments described, the model was implemented on the publicly available TensorFlow framework, and the training process was run on a NVIDIA TITAN X GPU.

During training, Adam was used; a first-order gradient-based optimiser with a learning rate of 0.0015 (see Kingma, D. P., and Ba, J. 2015, "Adam: A Method for Stochastic Optimization", In International Conference on Learning Representations (ICLR), 1-15). The training typically converges after 100 iterations in these experiments.

To prevent the neural networks from overfitting, data with abundant moving characteristics was collected (i.e. data containing a wide range of different motions so as to facilitate generalisation to unseen motions in the testing phase), and Dropout (Srivastava, N.; Hinton, G.; Krizhevsky, A.; Sutskever, I.; and Salakhutdinov, R. 2014, "Dropout: A Simple Way to Prevent Neural Networks from Overfitting", Journal of Machine Learning Research 15:1929-1958) was adopted in each LSTM layer, randomly dropping 25% of units from neural networks during training. This method significantly reduces overfitting, and proves to perform well for new users, devices and environments.

The training data were collected using all attachments (handheld, etc.).

Comparison with Other deep Neural Network (DNN) Frameworks:

To evaluate the approach of adopting a 2-layer Bidirectional LSTM (Bi-LSTM) for polar vector regression, its validation results were compared with various other DNN frameworks, including frameworks using vanilla RNN, vanilla Convolution Neural Network, 1-layer LSTM, and 2-layer LSTM without Bidirection.

Figure 8:
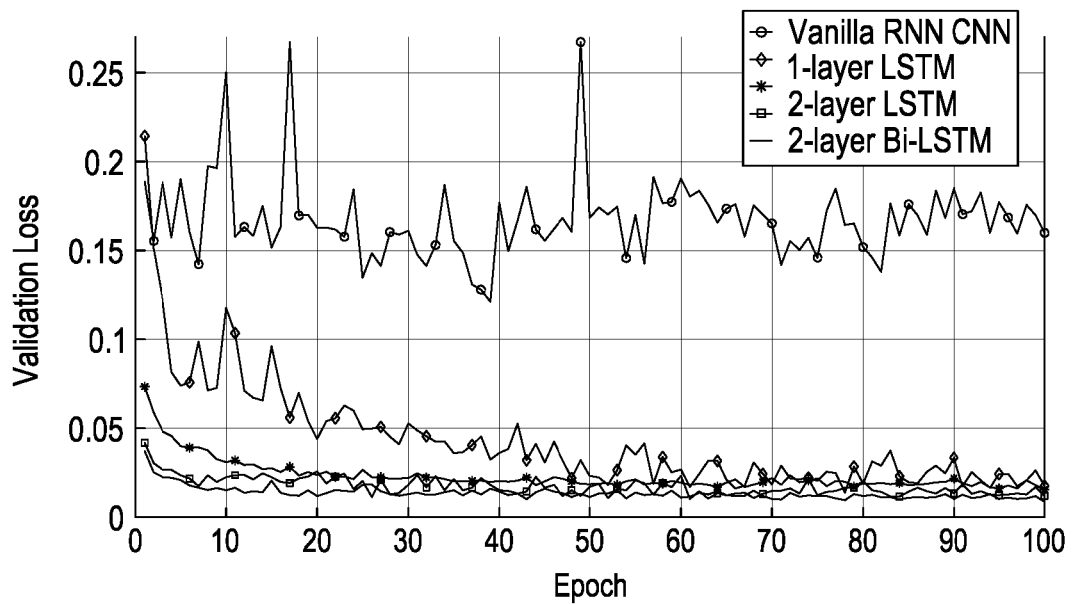
FIG. 8 illustrates validation loss line comparisons for different deep neural network implementations of embodiments of the invention.

FIG. 8 shows their validation loss lines, comparing the losses from adopting the various frameworks.

The loss line for the proposed framework with 2-layer Bi-LSTM converges more quickly, and stays lower and more smoothly during the training than all other neural networks, demonstrating the power of the approach disclosed herein The skilled person would appreciate that vanishing (and its counterpart, exploding) gradients are a problem with non-gated RNNs, as the small errors from each step when back-propagated rapidly tend to zero, meaning that error signals from sensor inputs that are temporally distant from desired regressor outputs are difficult to learn. Cony-nets look at the whole sequence in one go, but because of the high-dimensionality of the input (e.g. 200 frames, or samples), it is much harder to relate the input to the desired output. A gated RNN (like an LSTM) learns which latent states to propagate at each time instant and this acts as a form of compression/dimensionality reduction.

Testing: Separate training for each different attachment was found to give better performance in prediction as compared to training all attachment types together in the experiments performed. A prediction model of 2-layer Bi-LSTM trained from separate attachments was therefore implemented for the experiments described.

In practice, the skilled person would appreciate that existing techniques can be adopted to recognise different attachments from pure IMU measurements (Brajdic and Harle 2013, referenced above), providing the ability to dynamically switch between trained models Baselines: Two traditional methods were selected as baselines: pedestrian dead reckoning (PDR) and strapdown inertial navigation system (SINS) mechanism (Savage, P. G. 1998, "Strapdown Inertial Navigation Integration Algorithm Design Part 1: Attitude Algorithms", Journal of Guidance, Control, and Dynamics 21(1):19-28), to compare with the prediction results generated by embodiments of the invention.

PDR algorithms are seldom made open-source, especially a robust PDR useable for different attachments, so code was implemented according to the paper of Brajdic and Harle (Brajdic, A., and Harle, R. 2013, "Walk detection and step counting on unconstrained smartphones", Ubicomp 13) for step detection and the paper of Xiao et al. (Xiao, Z.; Wen, H.; Markham, A.; and Trigoni, N. 2014, "Robust pedestrian dead reckoning (R-PDR) for arbitrary mobile device placement", In IPIN) for heading and step length estimation.

Tests Involving Multiple Users and Devices

A series of experiments were conducted inside a large room 32 with new users 36 and mobile phones 102 to show the ability of the approach disclosed herein to generalise beyond scenarios covered in the training data. Vicon system provides a highly accurate reference (ground truth locations and poses) to measure the location errors.

The first group of tests include four users 36, walking randomly for two minutes with the phone 102 in different attachments, e.g. in hand, pocket and handbag respectively, covering everyday behaviours.

Only data from User 1 was included in the training dataset for these experiments—data from three of the users is excluded from the training dataset for use in testing.

The performance of the approach disclosed herein (and in particular the IONet embodiment described in detail) is measured as error cumulative distribution function (CDF) against Vicon ground truth and compared with conventional PDR and SINS.

Figure 4A:
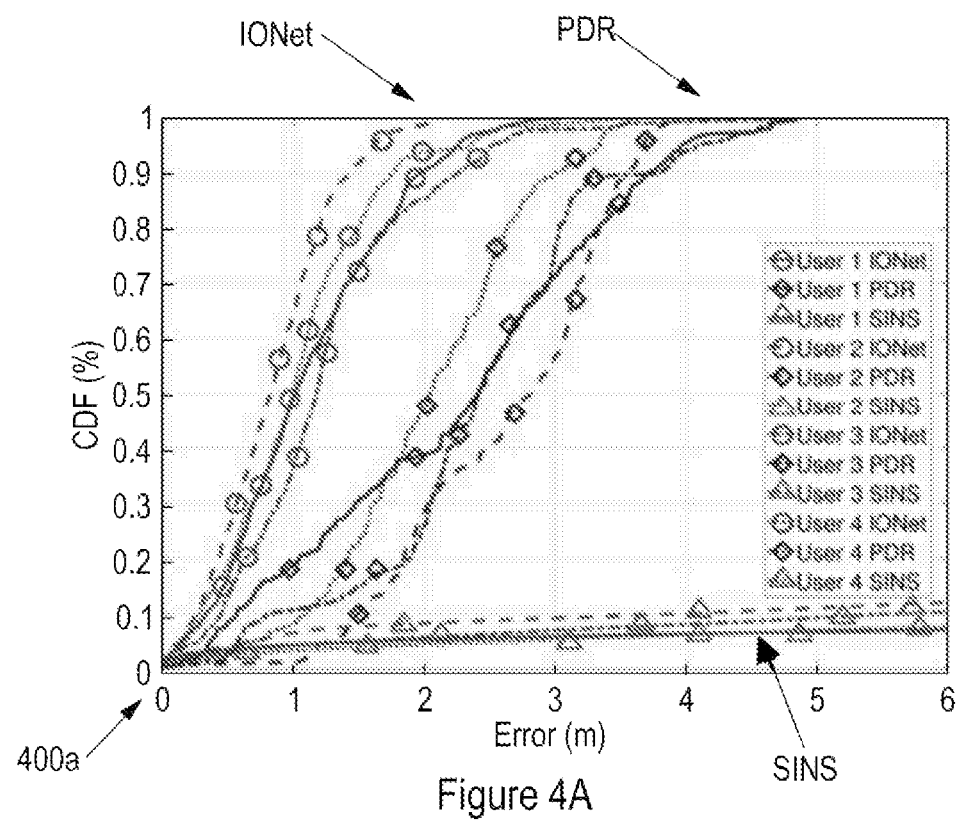
FIG. 4A shows performance of an embodiment of the invention as compared to prior art techniques in tests with different users in which the mobile device was handheld.
Figure 4B:
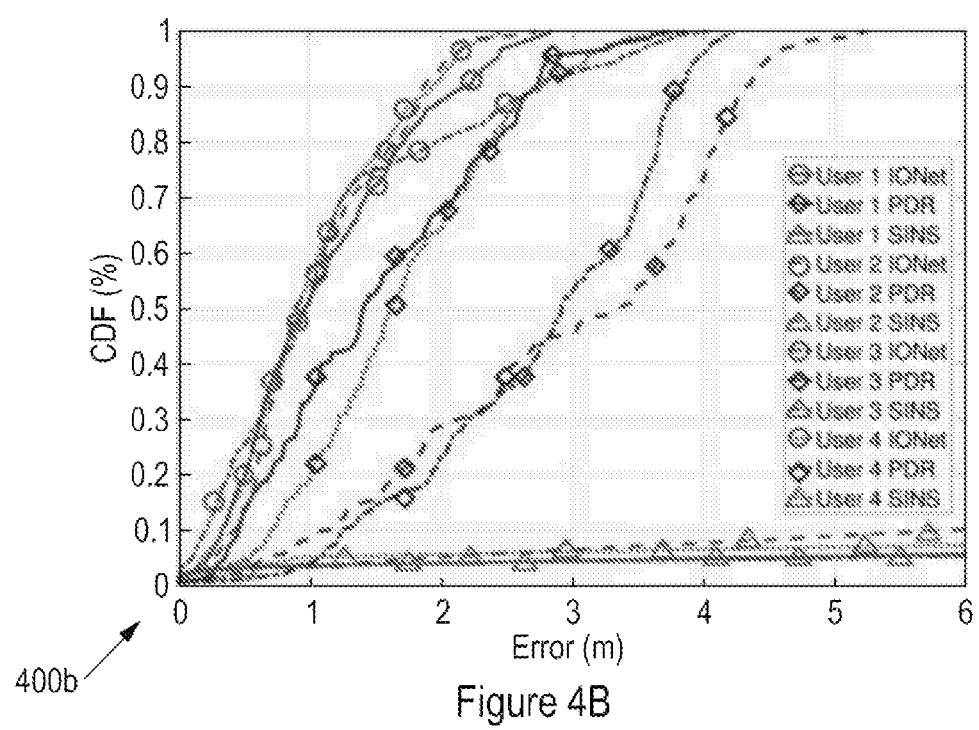
FIG. 4B shows performance of an embodiment of the invention as compared to prior art techniques in tests with different users in which the mobile device was in a pocket of the user.
Figure 4C:
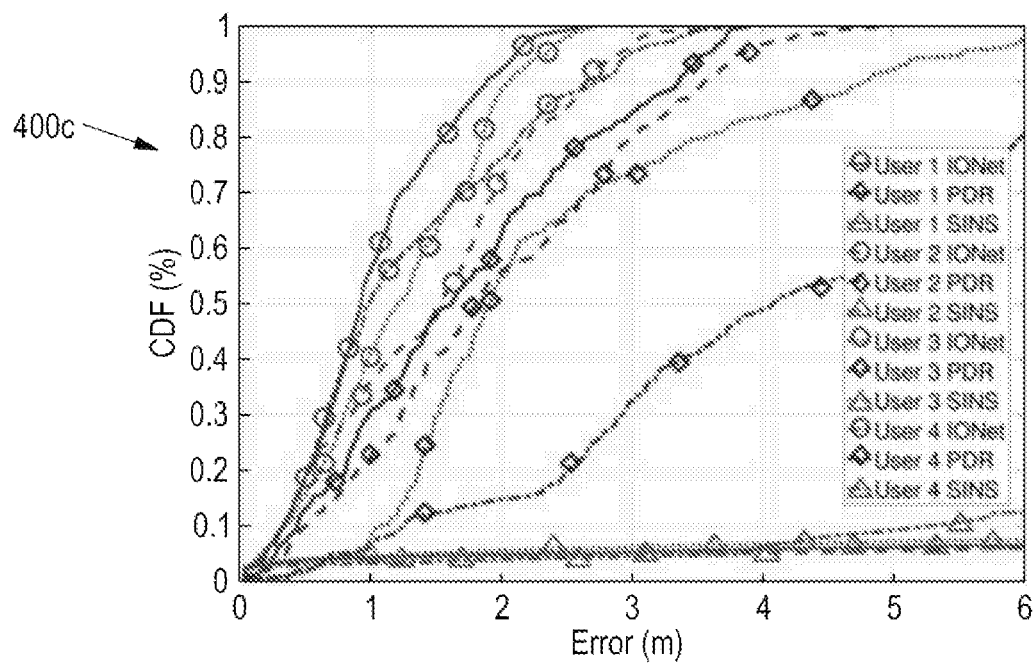
FIG. 4C shows performance of an embodiment of the invention as compared to prior art techniques in tests with different users in which the mobile device was in a handbag of the user.

A first group of experiments was performed to test the performance across different users 36, shown in FIGS. 4A to 4C.

In these figures, the steepest set of lines (marked with circles) shows data for IONet, the next set of lines (darkest set, marked with diamonds) shows data for PDR and the shallowest set of lines (marked with triangles) shows data for SINS.

Within each set, data for User 1 is shown with a solid line, data for User 2 with a dashed line, data for User 3 with a dotted line and data for User 4 with a dash-dotted line.

FIGS. 4A to 4C illustrate that the proposed approach outperforms the competing methods in every attachment—FIGS. 4A to 4C show data for when the device 102 is handheld 400a, in a pocket 400b, and in a handbag 400c, respectively.

Figure 10A:
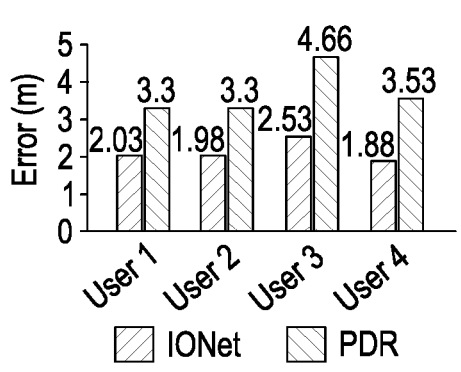
FIGS. 10A and 10B illustrate maximum position error within 90% test time for multiple users and for multiple phones, respectively.

The skilled person will appreciate that if raw data is directly triply integrated by SINS, its error propagates exponentially. By contrast, the maximum error of the approach disclosed herein stayed at around 2 meters within 90% of the testing time in the experiments performed; a 30%-40% improvement compared with traditional PDR as is shown in FIG. 10A.

Figure 5A:
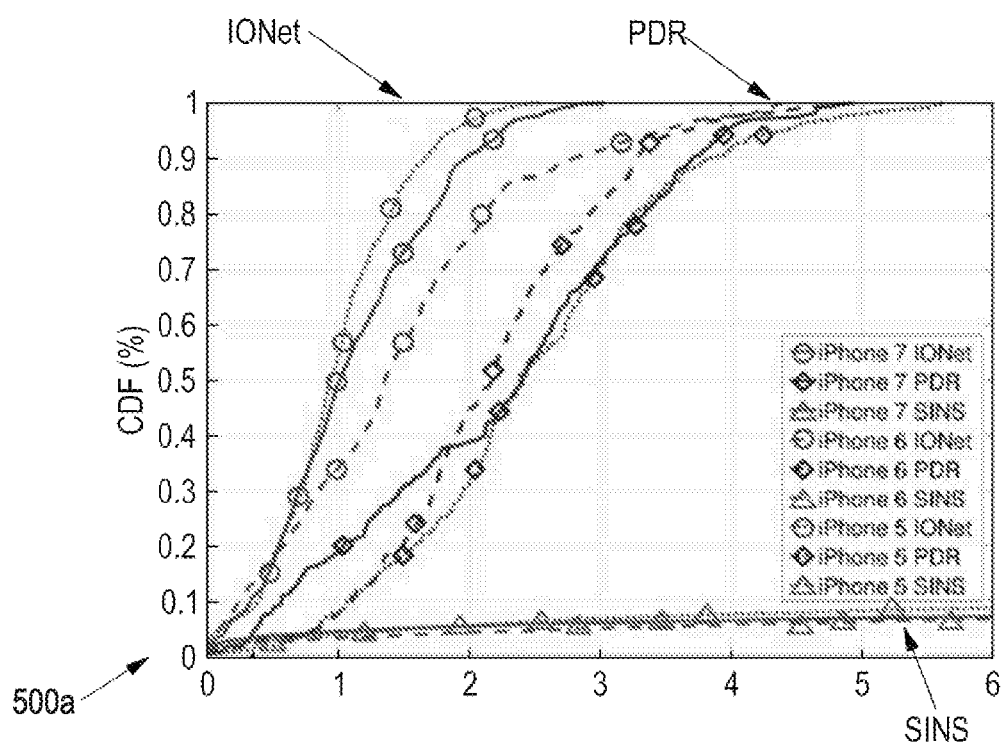
FIG. 5A shows performance of an embodiment of the invention as compared to prior art techniques in tests with different mobile device types in which the mobile device was handheld.
Figure 5B:
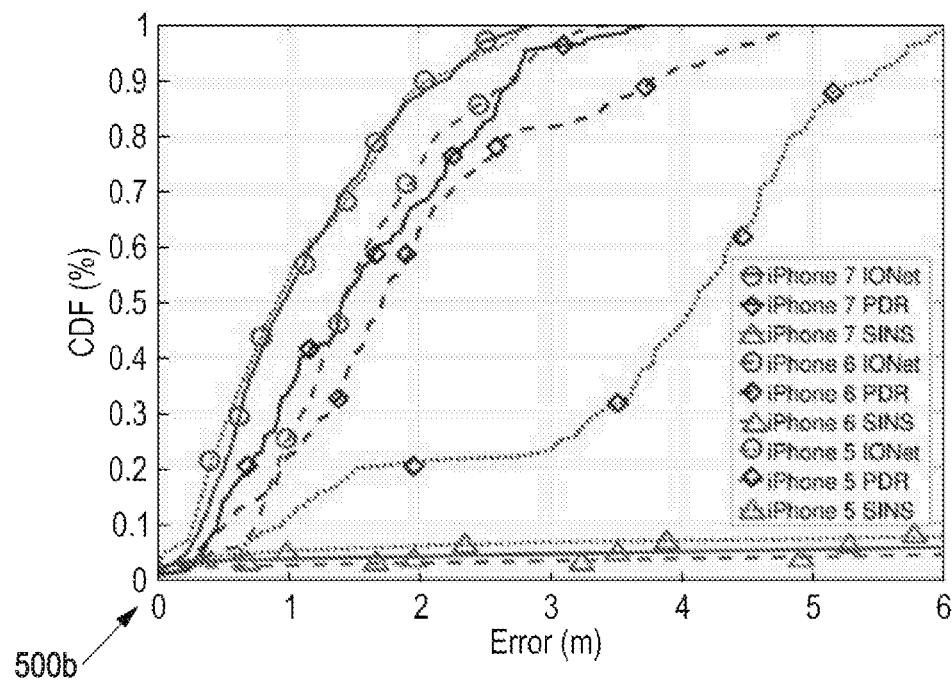
FIG. 5B shows performance of an embodiment of the invention as compared to prior art techniques in tests with different mobile device types in which the mobile device was in a pocket of the user.
Figure 5C:
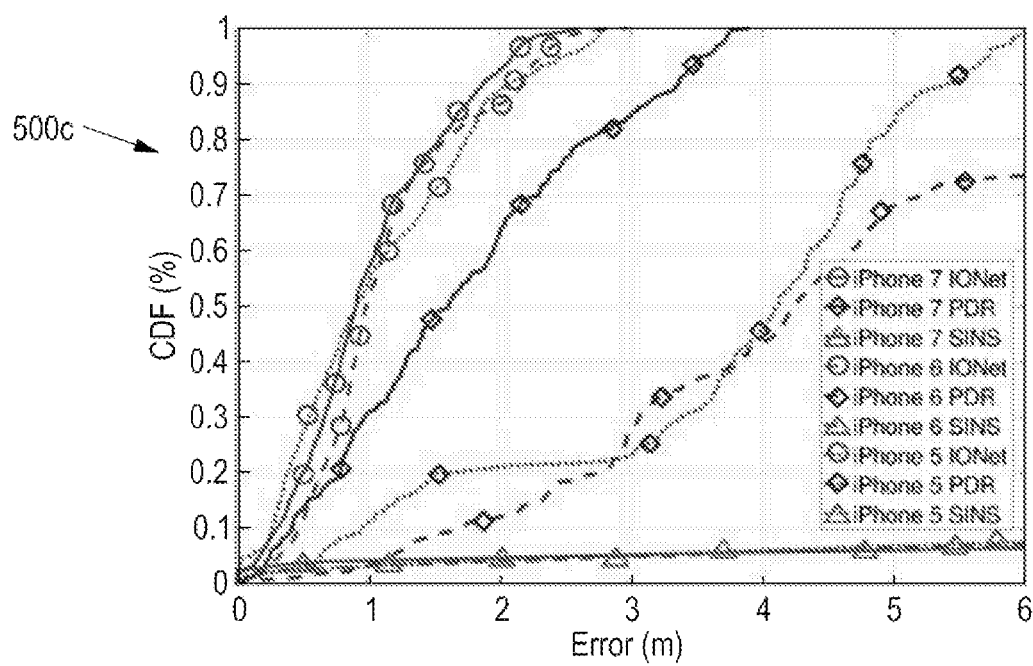
FIG. 5C shows performance of an embodiment of the invention as compared to prior art techniques in tests with different mobile device types in which the mobile device was in a handbag of the user.

Another group of experiments was performed to test the performance across different devices 102, shown in FIGS. 5A to 5C—FIGS. 5A to 5C show data for when the device 102 is handheld 500a, in a pocket 500b, and in a handbag 500c, respectively. Two different common consumer phones were tested; iPhone® 6 and iPhone® 5, whose IMU sensors, InvenSense MP67B and ST L3G4200DH, are different from that of the training device, iPhone 7 (IMU: InvenSense ICM-20600).

In these figures, the steepest set of lines (marked with circles) shows data for IONet, the next set of lines (darkest set, marked with diamonds) shows data for PDR and the shallowest set of lines (marked with triangles) shows data for SINS, as for FIGS. 4A-4C.

Within each set, data for iPhone 7 is shown with a solid line, data for iPhone 6 with a dashed line, and data for iPhone 5 with a dotted line.

Figure 10B:
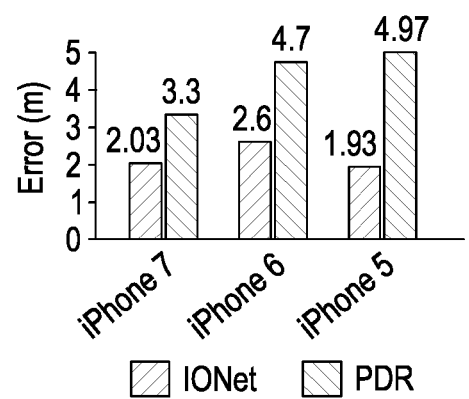

Although intrinsic properties of IMUs influence the quality of inertial measurements, the neural network embodiment being described shows good robustness, as illustrated in FIG. 10B.

FIGS. 10A and 10B show graphs of maximum position error within 90% test time separated by user 36 and by phone 102, respectively.

Large-scale Indoor Localisation

In further experiments, the approach was then applied to a more challenging indoor localisation scenario to demonstrate its performance in a new environment.

For the experiments being described, the neural network of the embodiment being described was trained on training data gathered within the Vicon-equipped training room only—no data was provided from elsewhere for training.

This embodiment was then directly applied to six large-scale experiments conducted on two floors of an office building (Floor A and Floor B; see FIGS. 6A-C and 7A-C). The new scenarios contained long straight lines and slopes, which were not contained in the training dataset. Lacking the high precise reference from Vicon, data from Google Tango® Tablet, a visual-inertial device, is taken as pseudo ground truth.

Figure 6A:
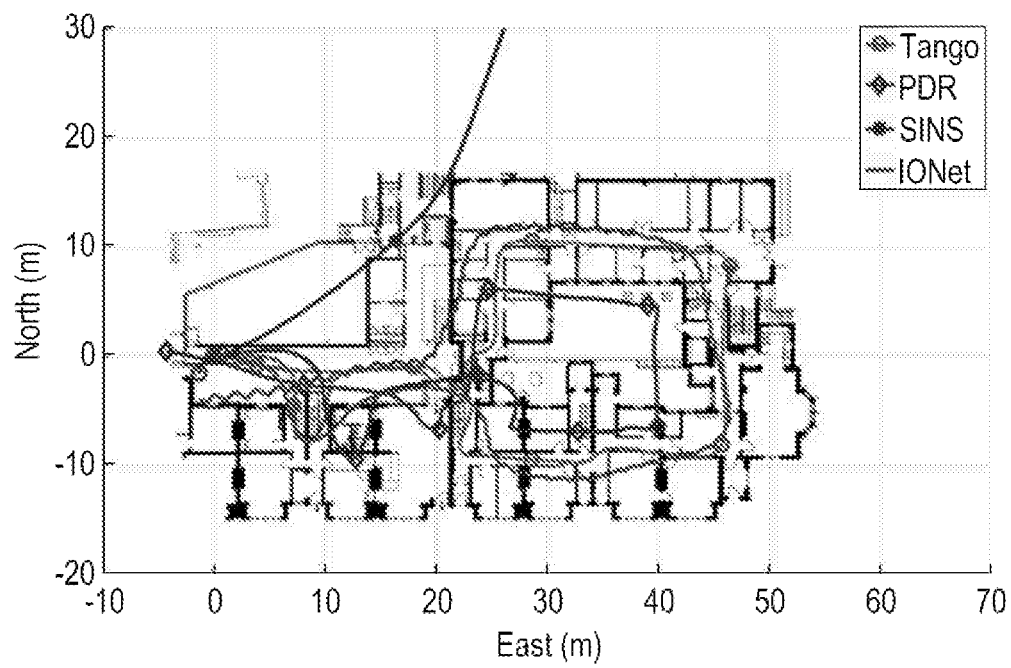
FIG. 6A shows trajectories on floor A for the handheld mobile devices.
Figure 6B:
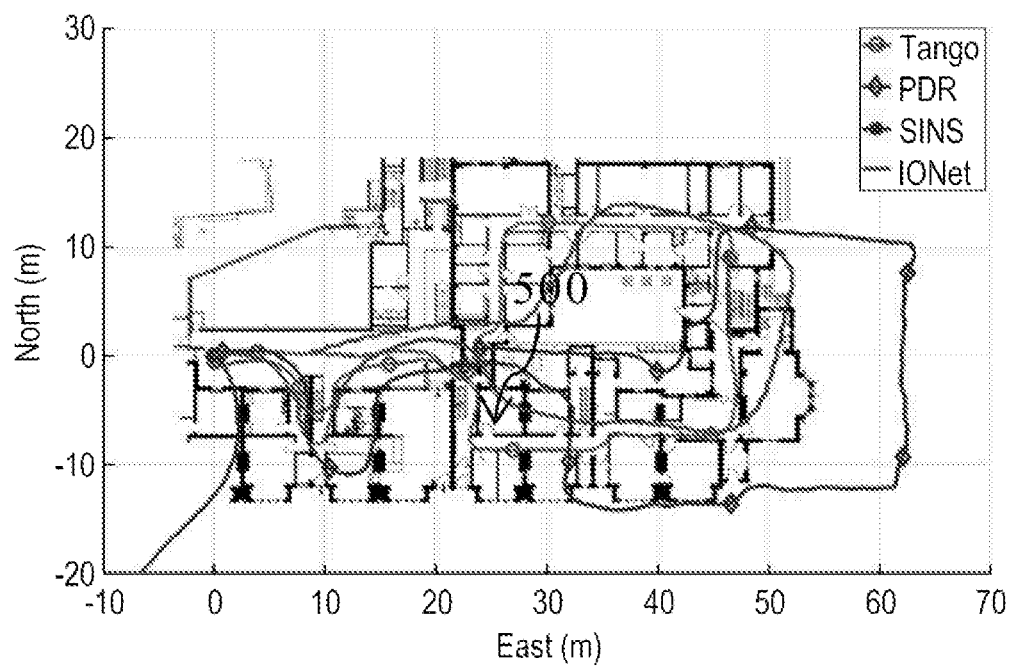
FIG. 6B shows trajectories on floor A for the mobile devices in a pocket.
Figure 6C:
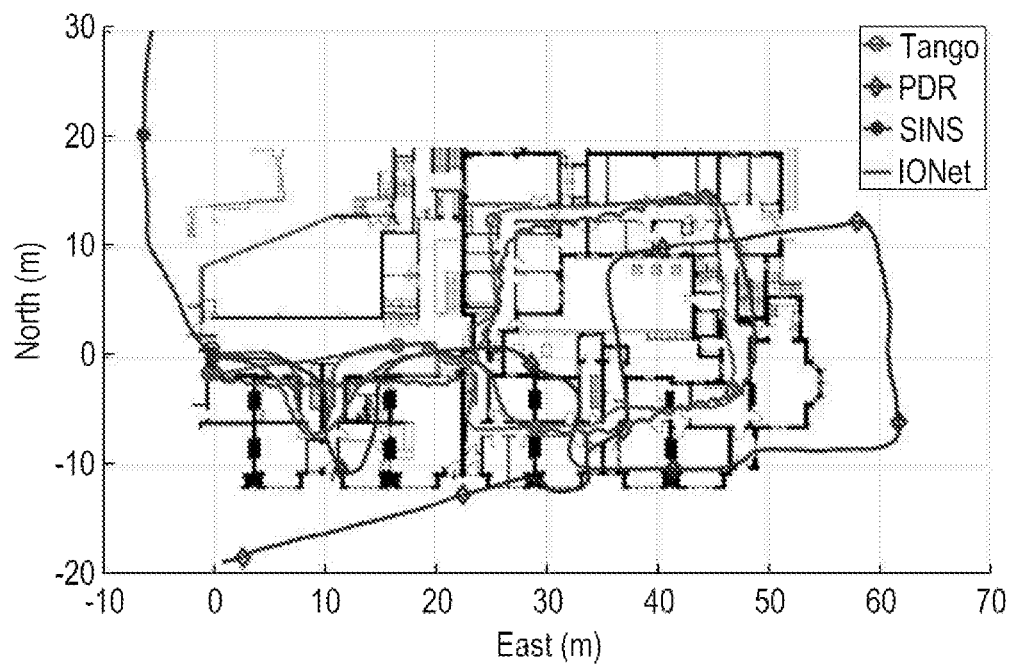
FIG. 6C shows trajectories on floor A for the mobile devices in a handbag.
Figure 7A:
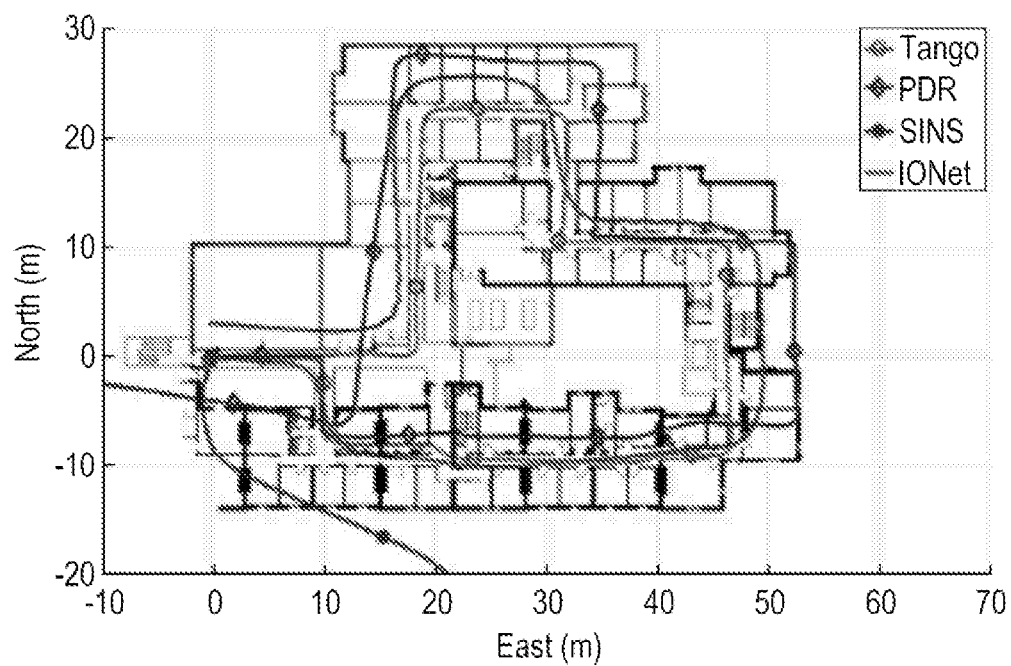
FIG. 7A shows trajectories on floor B for the handheld mobile devices.
Figure 7B:
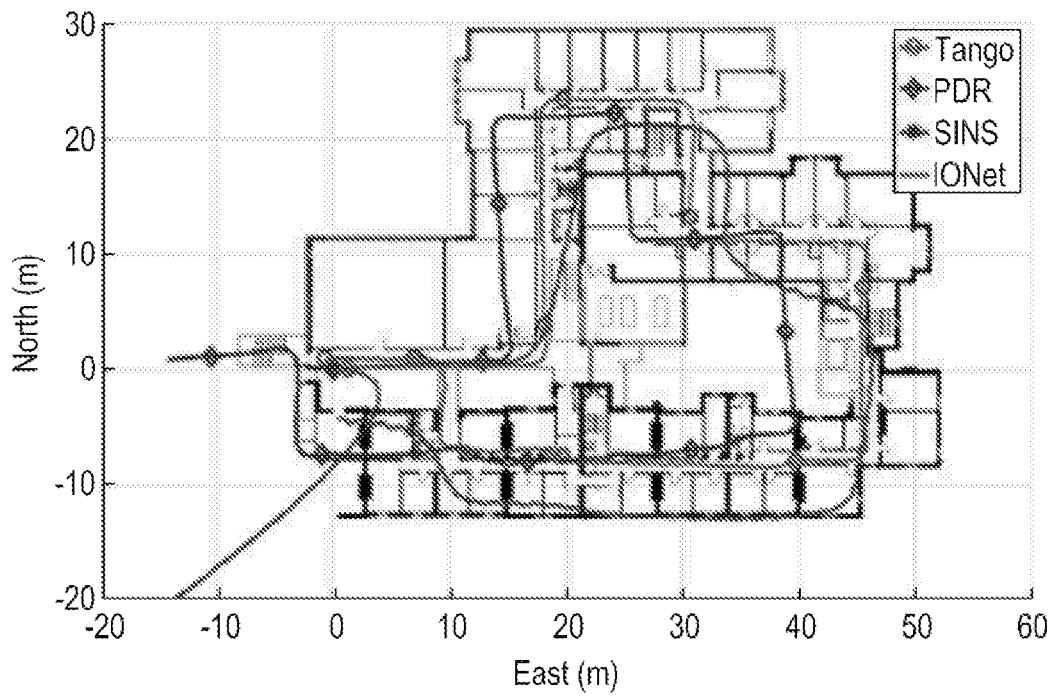
FIG. 7B shows trajectories on floor B for the mobile devices in a pocket.
Figure 7C:
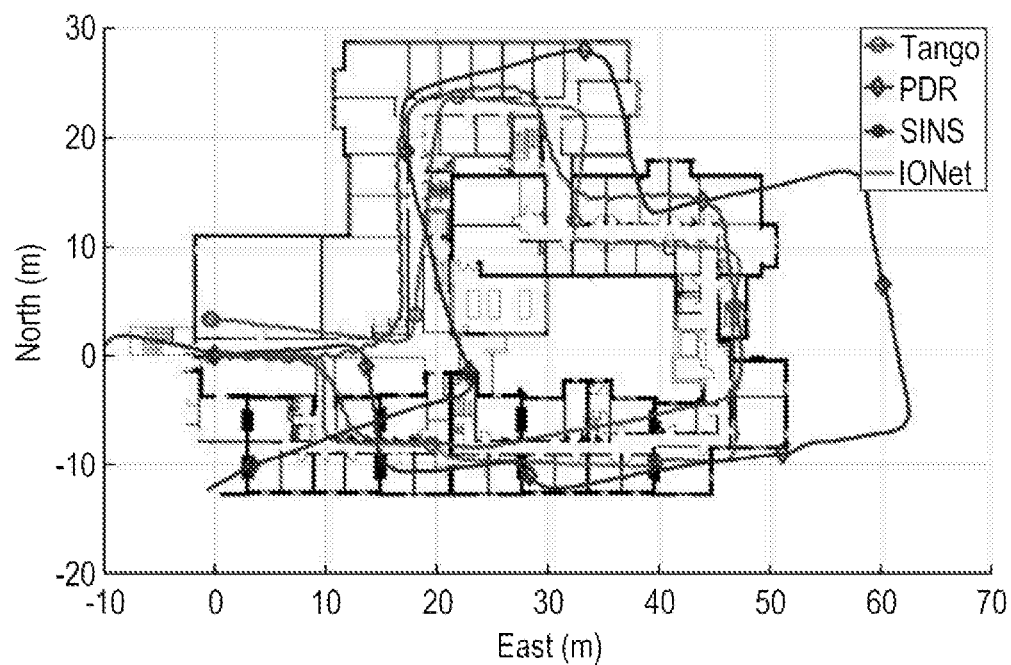
FIG. 7C shows trajectories on floor B for the mobile devices in a handbag.

The floor maps are illustrated in FIGS. 6A-C (Floor A—about 1650 m$^2$) and FIG. 7 A-C (Floor B—about 2475 m$^2$).

Users walked normally along corridors with the phone in three attachments—handheld, pocket and handbag respectively for FIGS. 6A and 7A, 6B and 7B, and 6C and 7C respectively.

Predicted trajectories as determined by the approach disclosed herein ("IONet"—Inertial Odometry Neural Network), Tango (pseudo ground truth), PDR and SINS are marked on the floorplans in these figures.

The predicted trajectories from the approach disclosed herein are closer to Tango trajectories, compared with two other approaches, as can be seen from FIGS. 6A-C and 7A-C.

The continuous propagating error of the SINS mechanism caused trajectory drifts growing exponentially with time (starting from an initial position of (0,0), toward the bottom left of the floorplan).

Impacted by erroneous step detection and/or inaccurate step stride and heading estimation, PDR accuracy is also limited.

Figure 11B:
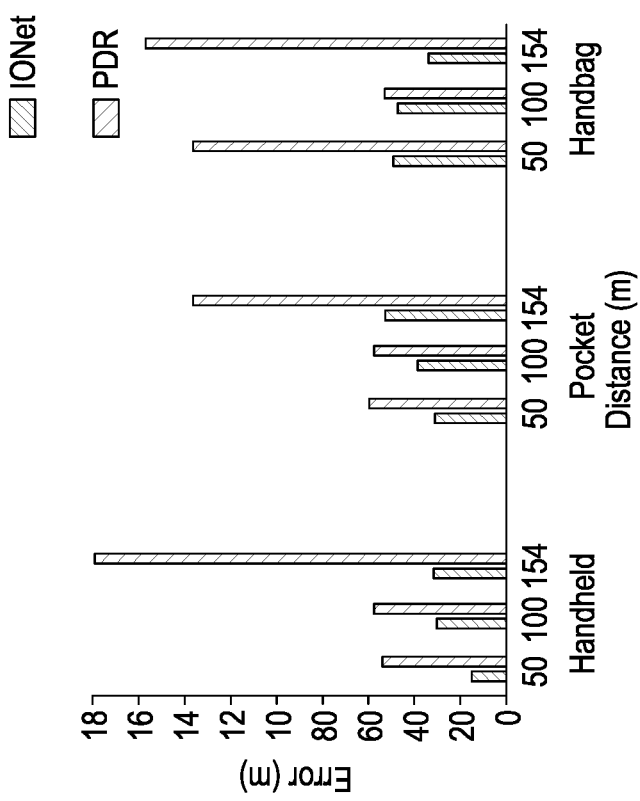
FIGS. 11A and 11B illustrate position error in large-scale indoor localisation for Floor A and for Floor B, respectively.
Figure 11A:
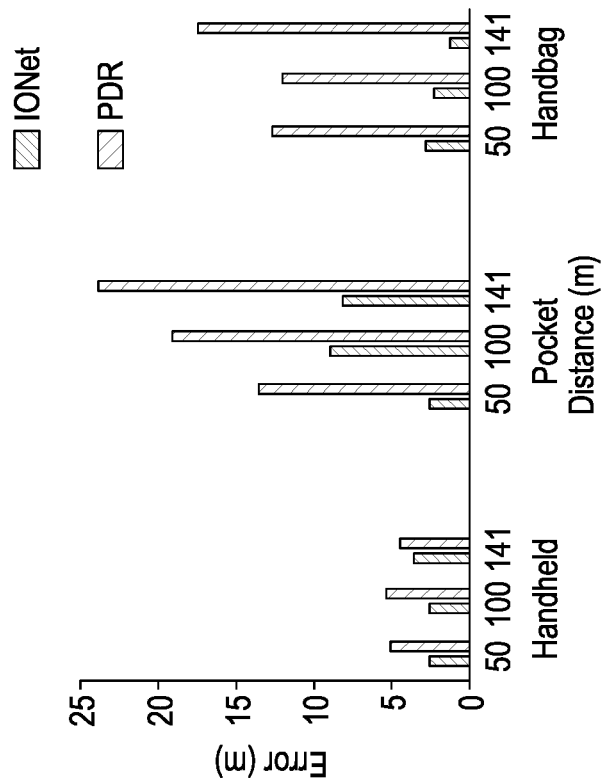

Absolute position error for IONet and PDR against pseudo ground truth from Tango was calculated at a distance of 50 m, 100 m and the end point; the results are shown in FIGS. 11A and 11B for Floor A and Floor B, respectively. A comparison for SINS is not shown, however its accuracy would drift rapidly off within a matter of seconds; it is not shown as it is so inaccurate as to be unusable with current smartphone sensors.

The approach of the embodiment tested (IONet) shows competitive performance over traditional PDR and has the advantage of generating a continuous trajectory, though its heading attitude deviates from true values occasionally.

Trolley Tracking

Further experiments were performed to consider a more general motion without walking steps involved; which is hard for traditional step-based PDR (which relies on periodic motion) or SINS (using a limited quality IMU of the type normally found in smartphones and the likes).

Tracking wheel-based motion including trolley, robot, baby-stroller and wheeler, has significant potential.

Current approaches to track wheel-based moving objects are mainly based on visual odometry or visual-inertial odometry (VIO) (Li, M., and Mourikis, A. I. 2013, *"High-precision, consistent EKF-based visual-inertial Odometry"*, The International Journal of Robotics Research 32(6):690-711). These approaches will not work when the device is occluded or operating in low light environments, such as when placed in a bag or pocket. Moreover, their high energy- and computation-consumption also constrain applications.

The IONet model was applied to a trolley tracking problem using only inertial sensors. Due to a lack of comparable technique, the proposed approach is compared with the state-of-the-art visual-inertial odometry Tango®.

The mobile devices (iPhone 7 and Google Tango) were attached on a trolley, pushed by a user.

Figure 9A:
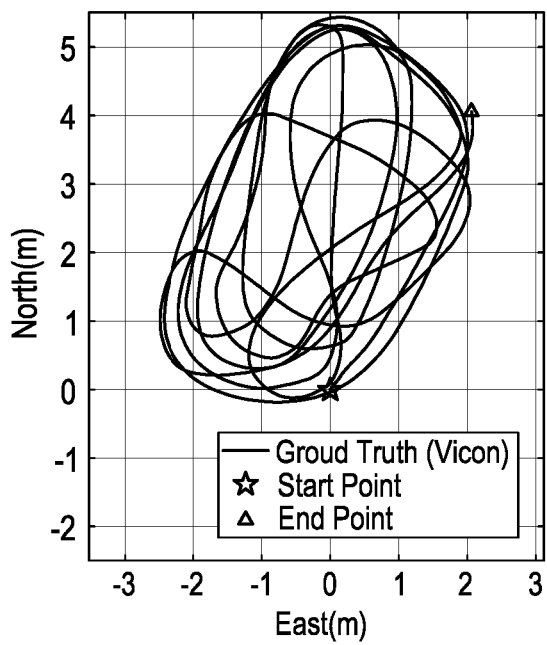
FIGS. 9A to 9C illustrate trolley tracking trajectories of ground truth, an embodiment of the present invention, and GoogleTango®, respectively.
Figure 9B:
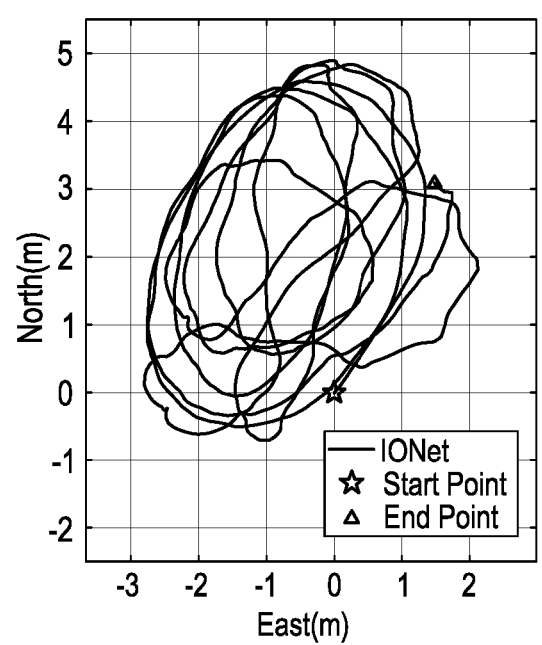
Figure 9C:
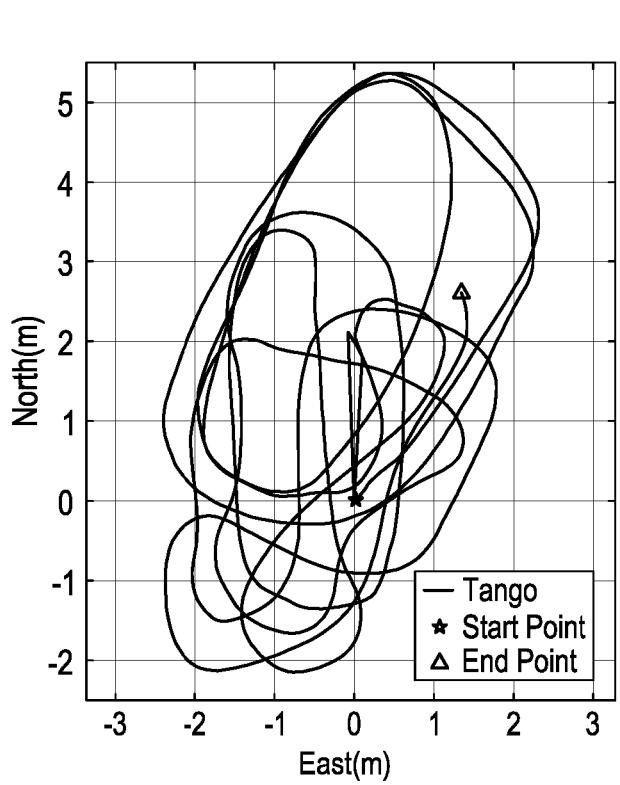
Figure 9D:
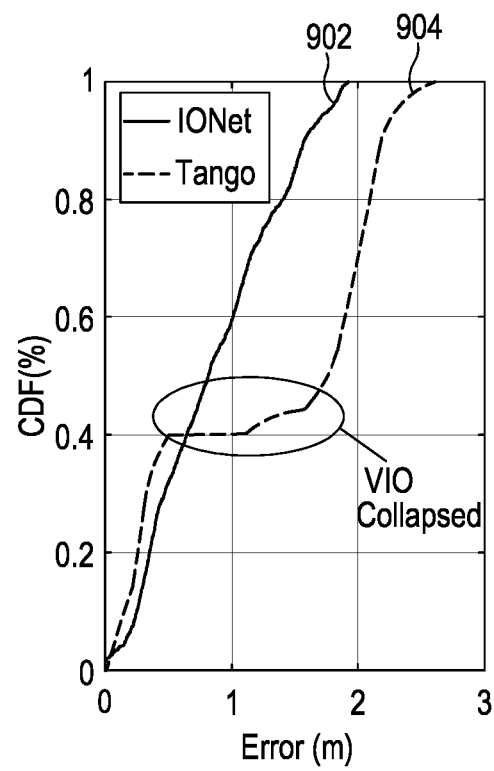
FIG. 9D illustrates the error cumulative distribution function corresponding to FIGS. 9A to 9C.

High-precision motion reference was provided by Vicon as ground truth. The trajectories from Vicon (FIG. 9A—ground truth), IONet (FIG. 9B) and Tango® (FIG. 9C) are shown, along with the CDF for IONet 902 and Tango 904 (FIG. 9D).

The IONet approach disclosed herein shows almost the same accuracy as Tango®, and better robustness because the pure inertial approach suffers less from environmental factors.

With the help of visual features, Video Inertial Odometry (VIO, in this case provided by Tango®) can constrain error drifts by fusing visual transformation and inertial system, but it will collapse when capturing incorrect features or no features, especially in open space. This happened in the experiment and is shown in FIG. 9D. Although VIO can recover from the collapse, it still leaves a large distance error; hence the error for Tango® has a sudden step increase and does not recover. It will also be appreciated that Tango® would not work in a dark environment, but embodiments of the present invention would.

Framework Overview and Options

A new framework for inertial odometry directly from IMU raw data is disclosed herein. The approach is derived from Newtonian mechanics.

In the embodiment described in detail, a neural network framework is used to learn inertial odometry directly from the IMU raw data. Other frameworks can be used in other embodiments. The approach is formulated as a sequential learning problem using deep recurrent neural networks to recover motion characteristics (e.g. the sinusoidal acceleration patterns typically resulting from pedestrian motion, or vibrations from trolley motion) in this embodiment. The skilled person will appreciate that the approach disclosed herein is agnostic to what the motion characteristics of the platform are, since the characteristics are learnt from the data.

The performance of the new framework, and in particular of IONet—the embodiment described above using a neural network implementation, was evaluated through extensive experiments including tests involving multiple users 36/devices 102, large-scale indoor localisation and trolley tracking. It was found to outperform both traditional step-based PDR and SINS mechanisms. This approach may therefore provide a more accurate and reliable indoor navigation system.

FIGS. 12A-F demonstrate embodiments using different IONet architectures.

Figure 12A:
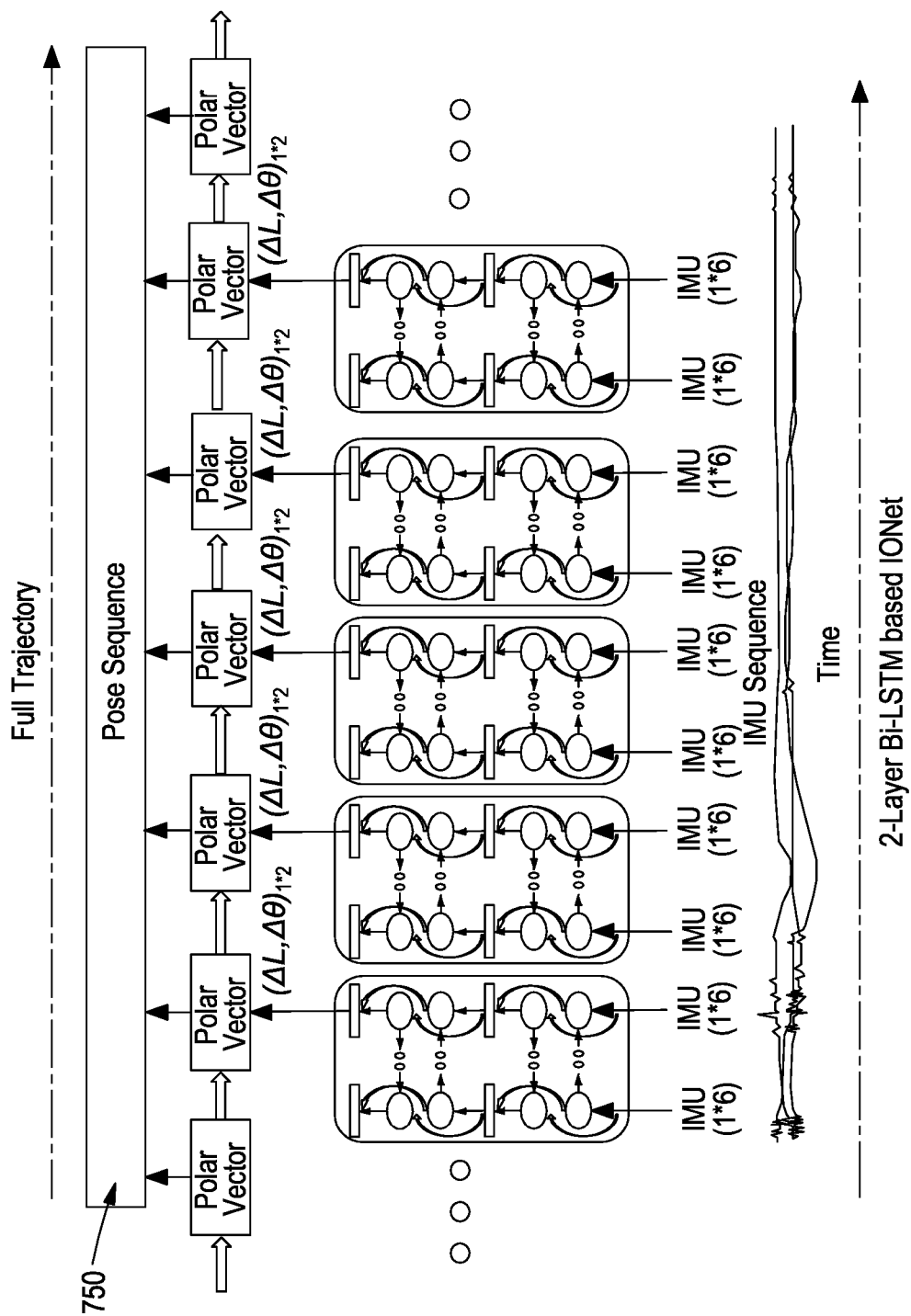
FIGS. 12A to 12G illustrate computational architectures for implementing embodiments of the invention.

FIG. 12A illustrates the framework described above for the deep recurrent neural network, 2-layer bidirectional LSTM IONet. The inputs are IMU sequences (n*6) and outputs are one polar vector (1*2).

Figure 12B:
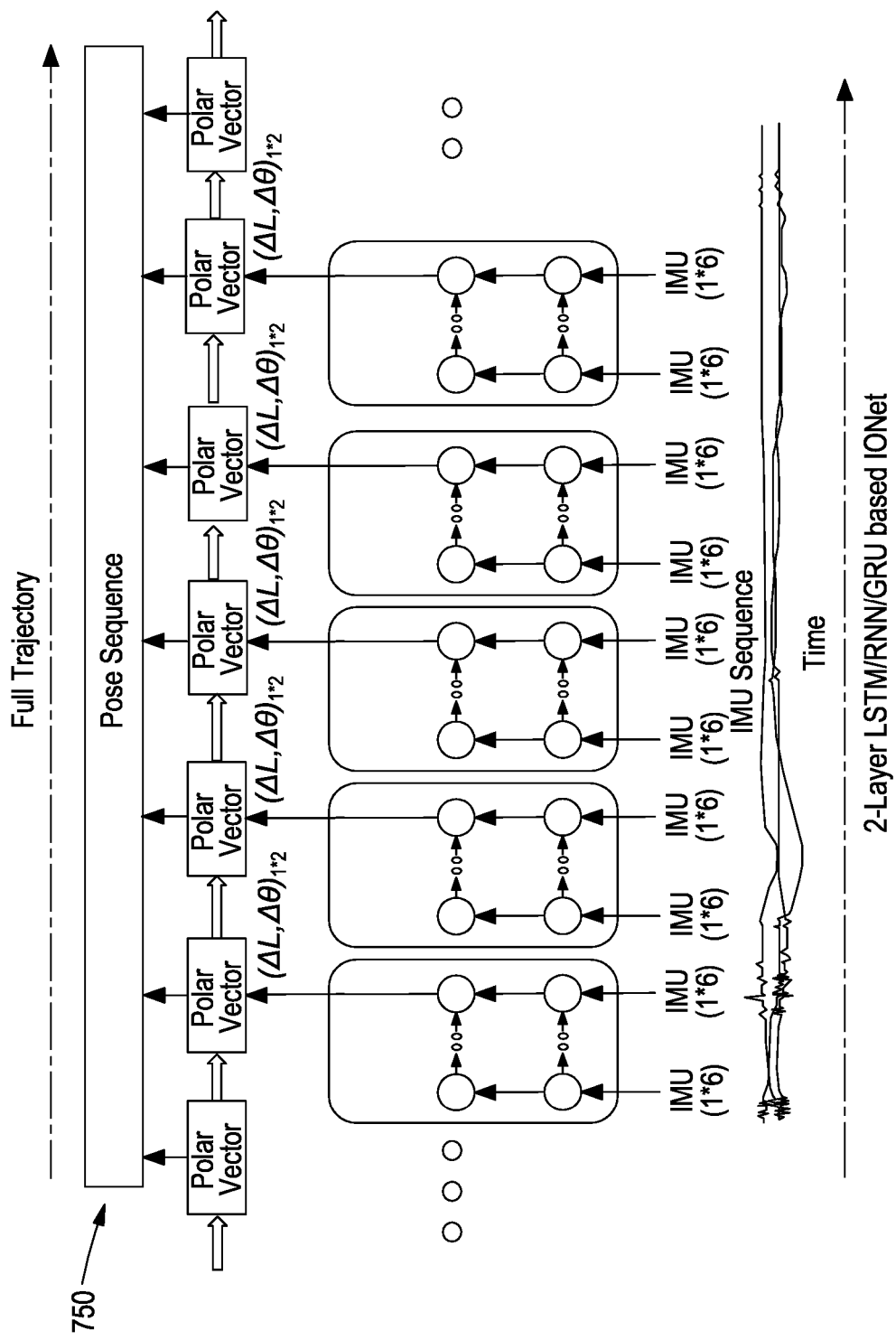

FIG. 12B illustrates an alternative framework in which only single-directional LSTM is used, along with the deep recurrent neural network. This figure illustrates possible deep neural networks architectures with three different sequence-based models, e.g. LSTM, RNN and GRU. The architectures can be only single direction, and can use any sequence-based model.

Figure 12C:
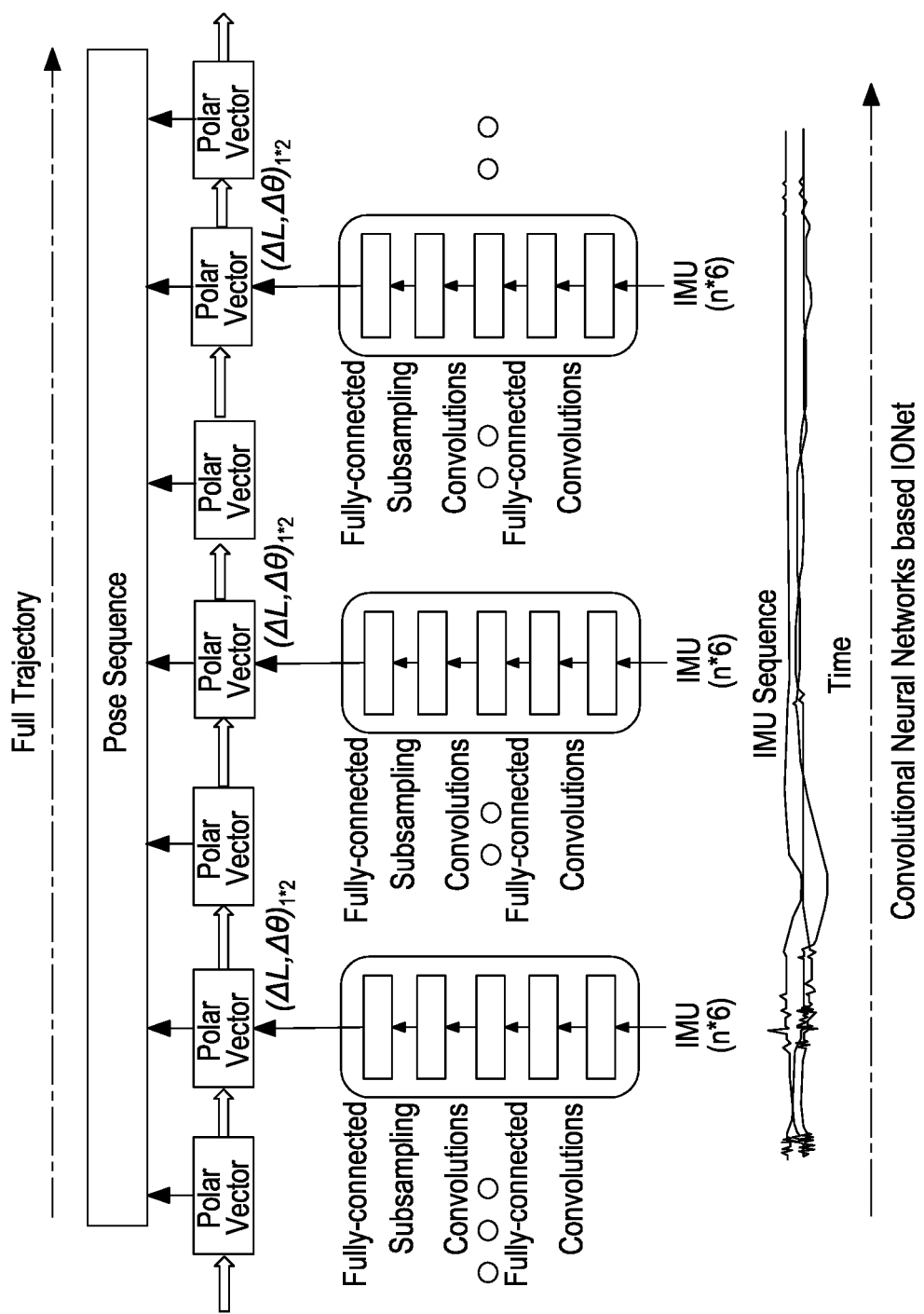

FIG. 12C illustrates an alternative framework in which a convolutional neural network is used instead of the deep recurrent neural network of FIGS. 12A and 12B. This figure illustrates a framework that adopts convolutional neural networks, instead of recurrent neural networks, to extract features and outputs polar vector. The inputs are IMU sequences (n*6) and outputs are one polar vector (1*2).

Figure 12D:
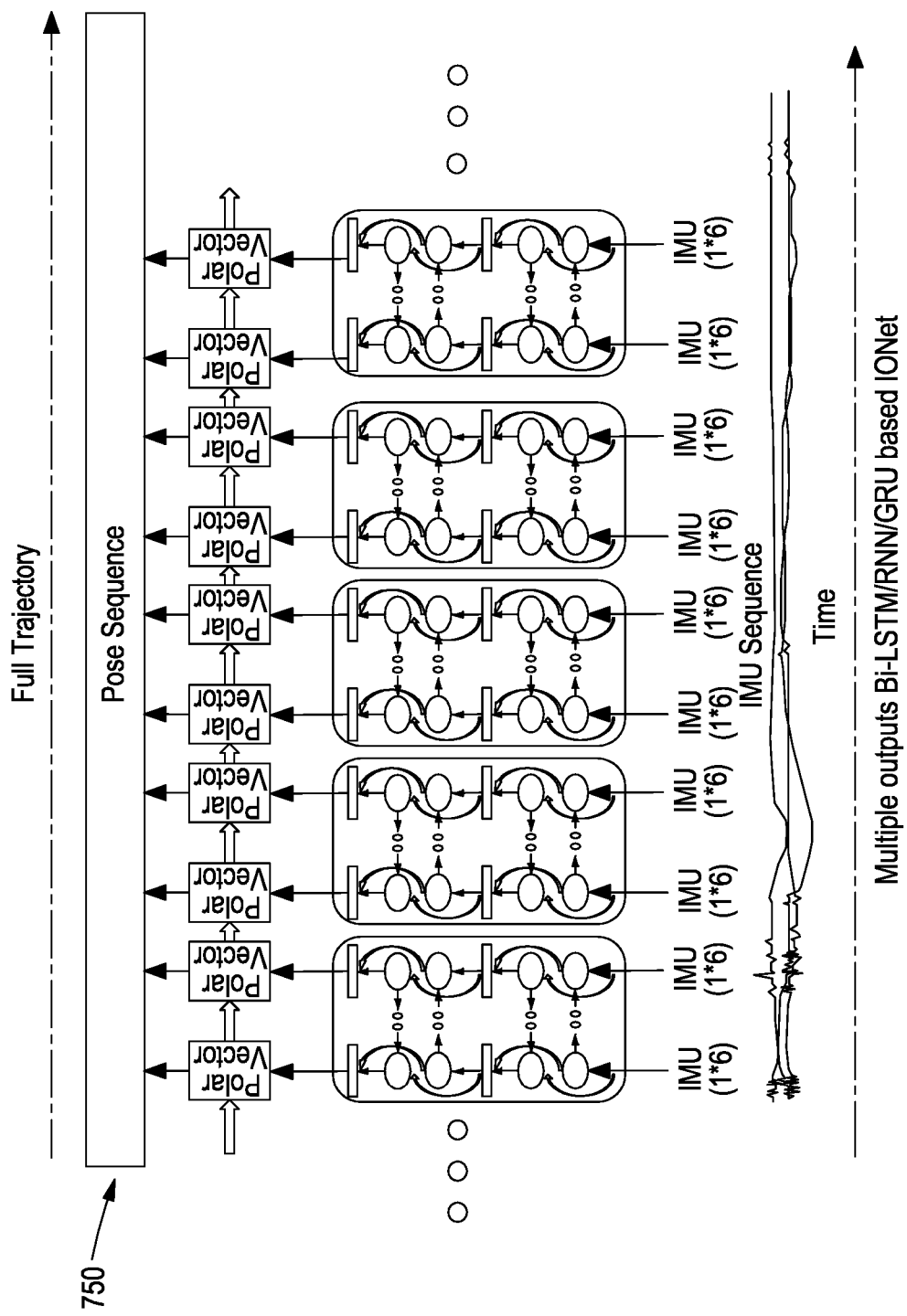

FIG. 12D illustrates an alternative framework similar to that of FIG. 12A but in which multiple outputs are provided for each window. This figure illustrates an alternative framework similar to FIG. 12A and FIG. 12B, but in which multiple outputs are provided instead of one output. The multiple outputs can be connected to increase the output data rate of final pose sequence. The inputs are IMU sequences (n*6) and outputs are multiple polar vectors (m*2).

The skilled person would appreciate that the multiple outputs could be full pose (e.g. Pitch, Roll, Yaw), velocity, and/or acceleration. Additionally or alternatively, the data could be regressed to any other continuous quantity like impact (e.g. how much force the foot is undergoing).

Additionally or alternatively, outputs may include a metric of uncertainty, e.g. what the anticipated error in the pose estimate is.

The skilled person will appreciate that alternative outputs can be implemented by regressing on another quantity during training.

Figure 12E:
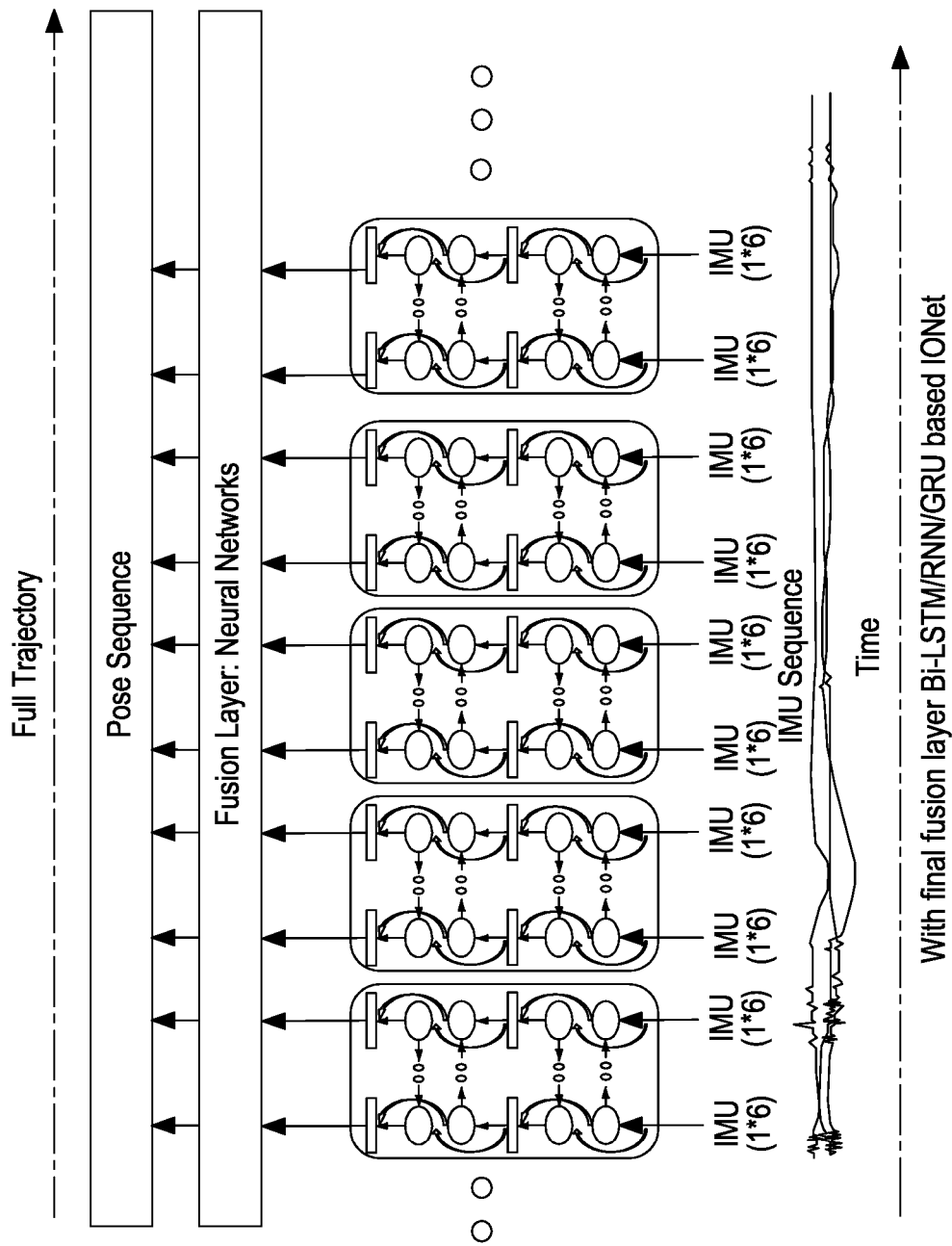

FIG. 12E illustrates an alternative framework similar to that of FIG. 12D but with an additional fusion layer. As compared to the architecture of FIG. 12D, this architecture can combine the multiple outputs of the recurrent neural networks with an additional fusion layer (fully connected or other layers).

The skilled person will appreciate that the fusion layer could be a shallow filter (e.g. a Kalman Filter) which performs optimal state estimation over time, or could be another neural network. The fusion layer can be arranged to take in pose-estimates over multiple windows e.g. 20 s of data, to further refine odometry estimates. It could also estimate long term errors in some embodiments. The fusion layer may be further arranged to incorporate map information, radio fingerprinting and/or the likes to provide global localisation.

Figure 12F:
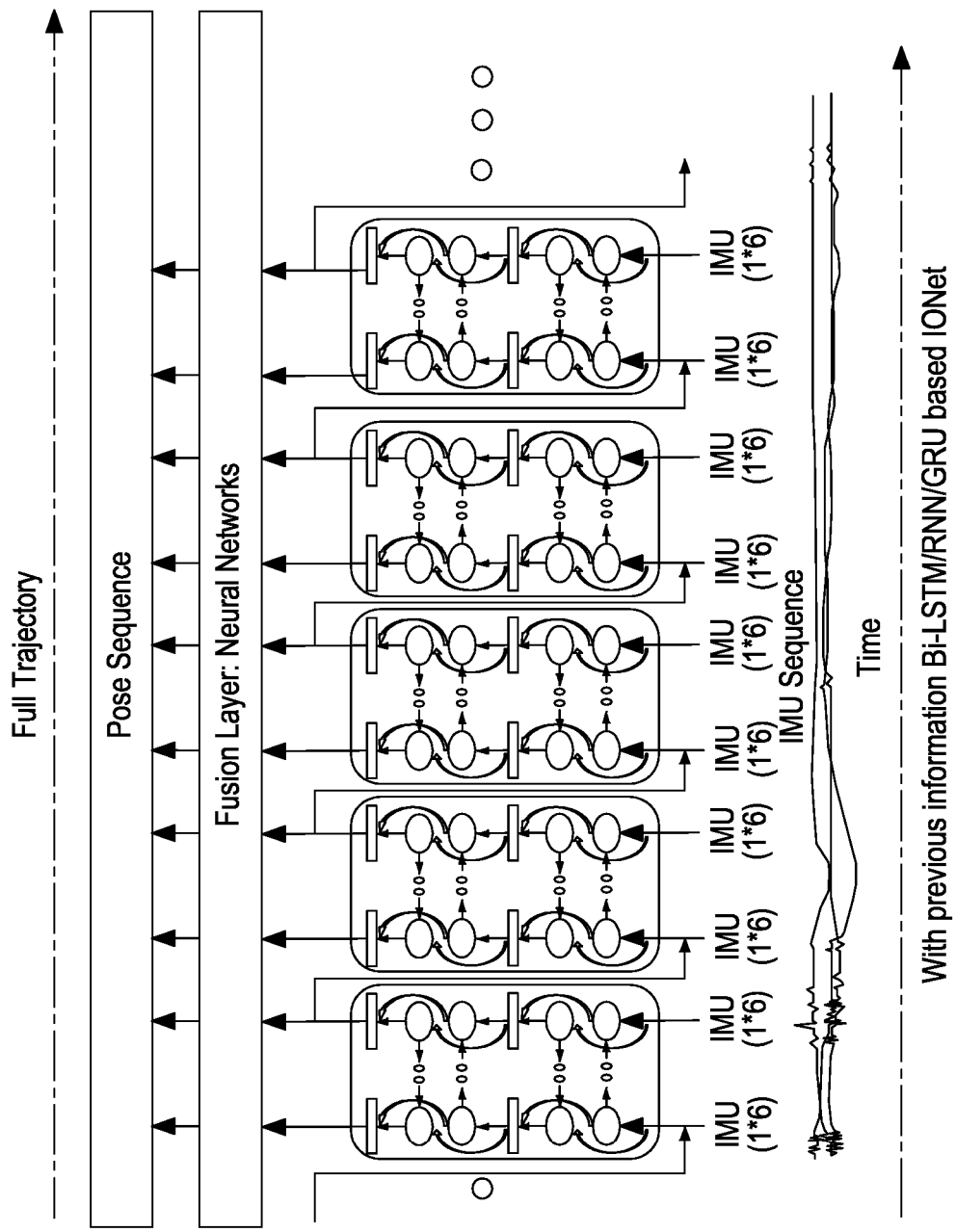

FIG. 12F illustrates an alternative framework similar to that of FIG. 12E but with an additional input of previous information. This figure illustrates an architecture that exploits information from a previous sequence. The representations of the outputs/hidden states from previous sequence are encoded with the inputs of current sequence to update models.

The skilled person will appreciate that, rather than having completely separate windows, the ability to propagate some latent state (which could represent information such as the attachment location e.g. hand/foot or even platform (human/vehicle)) may further enhance location estimation. This latent state does not need to be explicitly related to a real-world attribute; the neural network would learn what a sensible latent state to propagate is. The skilled person will therefore appreciate that, whilst one or more initial states are treated as unknown (i.e. values for them are not propagated between windows), one or more other initial states are propagated between windows in some embodiments.

Figure 12G:
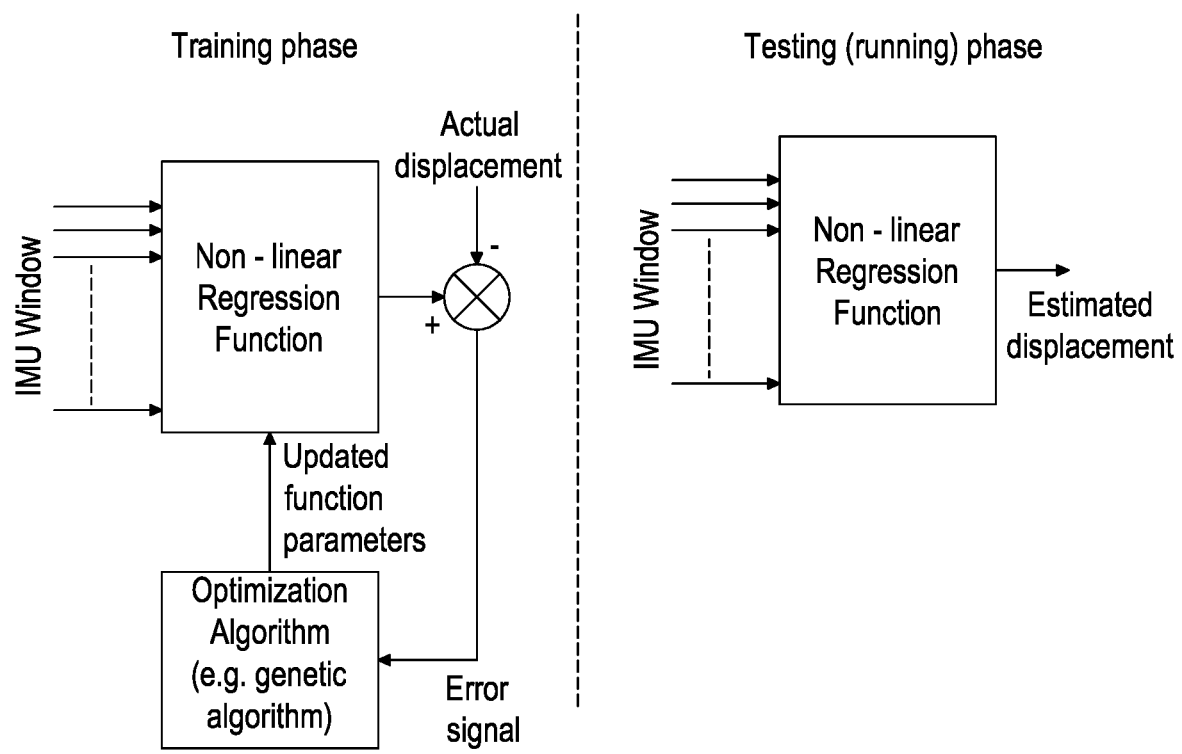

FIG. 12G demonstrates an embodiment using a different architecture, without a neural network.

In the training phase, windowed IMU training data is fed to a non-linear regression function. An estimated displacement (change in navigation state—this may be the same polar delta vector as discussed for other embodiments above) is compared to the actual (ground truth) displacement, and the errors are used by an optimisation algorithm (e.g. a genetic algorithm) to update function parameters for the non-linear regression function. This process is continued until accuracy is held to be satisfactory.

In the testing phase (at run time), windowed IMU data is fed to the non-linear regression function and an estimated displacement is output; this may be in the form of one or more of a vector, a location estimate, a trajectory, or the likes, as discussed for other embodiments.

The skilled person would appreciate that that the regression function can be any parameterisable function e.g. fuzzy, neural network, spline etc., and the genetic algorithm (or any stochastic optimiser) is arranged to learn the parameters of the selected function.

Figure 13:
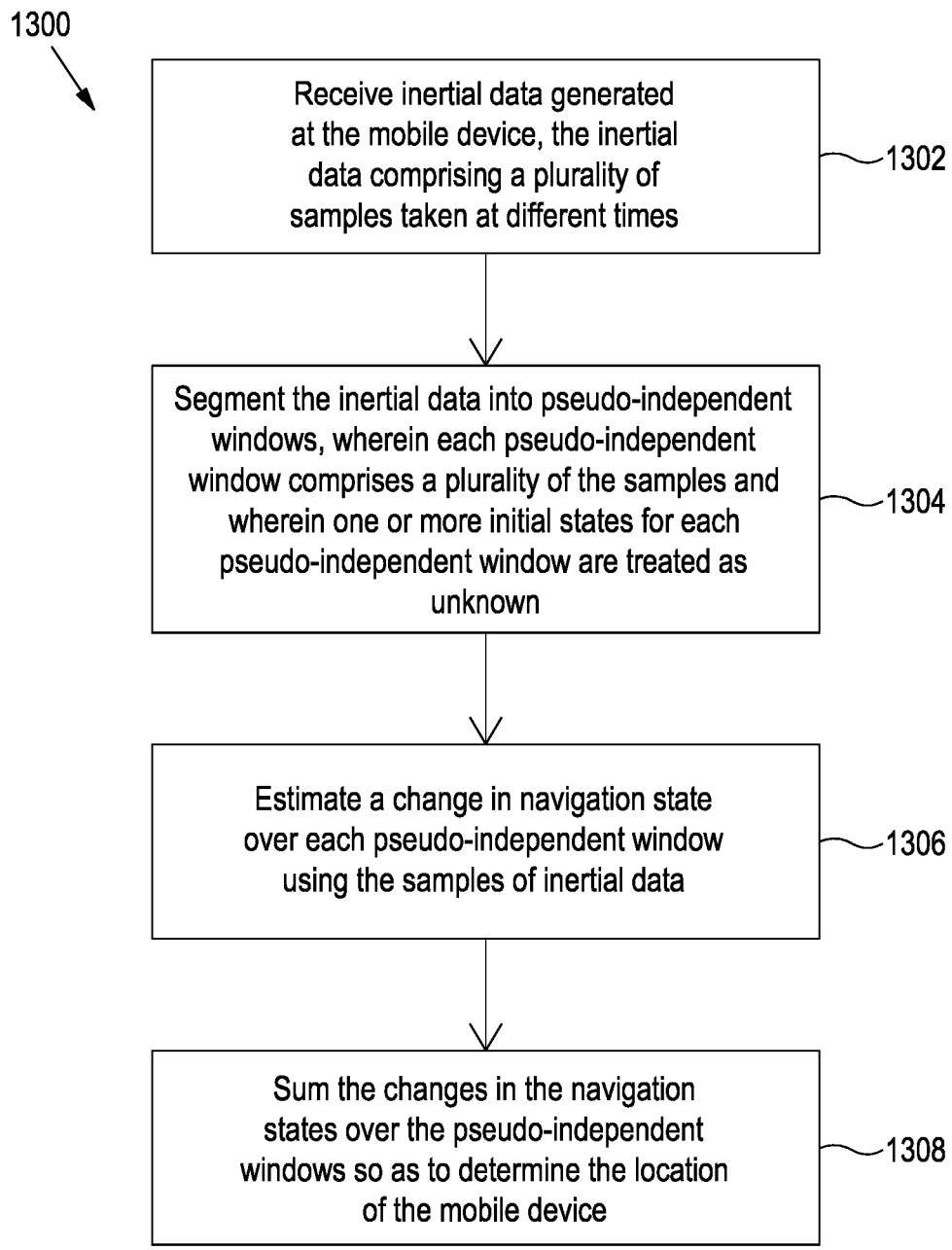
FIG. 13 is a flow-chart of the method of an embodiment of the invention.

FIG. 13 provides an overview of the method 1300 of various embodiments of the invention.

At step 1302, inertial data generated at the mobile device is received, the inertial data comprising a plurality of samples taken at different times.

At step 1304, the inertial data is segmented into pseudo-independent windows. Each pseudo-independent window comprises a plurality of the samples. One or more initial states for each pseudo-independent window (e.g. velocity, acceleration due to gravity) are treated as unknown.

At step 1306, a change in navigation state is estimated over each pseudo-independent window using the samples of inertial data. In the embodiments being described, inertial data is the only sensor data used to estimate change in navigation state, but other data (e.g. a user identification of attachment type, or a derived latent state relating to trolley vibrations for embodiments in which the device is on a trolley or the likes) may be propagated between windows and used with the inertial data.

At step 1308, the changes in the navigation states over the pseudo-independent windows are summed over consecutive windows so as to determine the location of the mobile device.

The steps 1300 may be repeated; the skilled person will appreciate that a sequence of locations with time provides a trajectory of the mobile device.

The invention claimed is:

1. A computer-implemented method of determining a location of a mobile device, the method comprising:

receiving inertial data generated at the mobile device, the inertial data comprising a plurality of samples taken at different times;

segmenting the inertial data into pseudo-independent windows, wherein each pseudo-independent window comprises a plurality of the samples and wherein one or more initial states for each pseudo-independent window are treated as unknown;

estimating a change in navigation state over each pseudo-independent window using the samples of inertial data; and summing the changes in the navigation states over the pseudo-independent windows; and determining the location of the mobile device based on the summing of the changes in the navigation states over the pseudo-independent windows;

wherein the estimating the change the change in navigation state over each pseudo-independent window is performed independently for each window, without requiring provision of an initial state for one window from the preceding window;

wherein initial velocity and gravity vector in a device body frame states are unknown and are not passed to subsequent windows as input; and wherein a regressor, optionally a neural network or a genetic algorithm, is used to estimate some representation of the initial velocity and the gravity vector implicitly encoded in latent features that the regressor extracts from the inertial data.

2. The method of claim 1 wherein the only sensor data used in estimating change in navigation state over each pseudo-independent window is inertial data.

3. The method of claim 1 wherein the change in navigation state over each pseudo-independent window is estimated using only the samples of inertial data.

4. The method of claim 1 wherein at least one of, and optionally both of, values for gravity vector or velocity of the mobile device are not estimated and are not propagated as initial states for the windows.

5. The method of claim 1 wherein an initial position of the mobile device is set as an origin and wherein the determined location is defined relative to that origin.

6. The method of claim 1 wherein values for device orientation are not estimated and propagated as an initial state for the windows.

7. The method of claim 1 wherein the one or more initial states treated as unknown include at least one of initial velocity state in a device body frame, gravity vector in the device body frame, or device pose, the device pose optionally including position and attitude, in a navigation frame.

8. The method of claim 1 wherein the initial velocity and the gravity vector in the device body frame states are not explicitly calculated.

9. The method of claim 1 wherein the regressor is used to learn a relationship between the inertial data of the samples and the change in navigation state.

10. The method of claim 1 wherein the inertial data comprises at least one of acceleration and gyroscope data.

11. The method of claim 1 wherein the change in navigation state comprises a current displacement expressing a horizontal distance travelled and an angular change expressing an angle between the current displacement and a displacement in a previous window.

12. The method of claim 1 wherein the method comprises only one explicit integrator, the integrator being present in the summing step.

13. The method of claim 12 wherein the integrator integrates a sequence of pairs into a trajectory, the sequence of pairs optionally being pairs of displacement and angle values.

14. The method of claim 1 wherein each pseudo-independent window comprises around 200 samples.

15. The method of claim 1 wherein one hundred samples are taken per second, optionally at a data sampling rate of 100 Hz.

16. The method of claim 1 wherein a bidirectional architecture is adopted to exploit dynamic context in that prior and subsequent samples around a selected sample are used to update the impact of the selected sample.

17. The method of claim 1 wherein the inertial data comprise inertial measurement unit (IMU) data from a smartphone or other IMU device.

18. The method of claim 1 wherein sensor measurements from each sample within a window are mapped to polar displacements over that window.

19. The method of claim 1 wherein the change in navigation state over each pseudo-independent window is provided as a delta vector, and the delta vectors are what is summed.

20. A computer-readable medium containing instructions that, when read by a processing circuitry, cause that processing circuitry to implement the method of claim 1.

21. A mobile device arranged to determine its location, the mobile device comprising:

an inertial measurement unit (IMU) arranged to generate inertial data, the inertial data comprising a plurality of samples taken at different times; and processing circuitry arranged to generate:

a segmentation of the inertial data into pseudo-independent windows, wherein each pseudo-independent window comprises a plurality of the samples and wherein one or more initial states for each pseudo-independent window are treated as unknown;

estimates of a change in navigation state over each pseudo-independent window using the samples of inertial data; and sums of the changes in the navigation state over the pseudo-independent; and a determination of the location of the mobile device based on the summing of the changes in the navigation states over the pseudo-independent windows;

wherein the estimating the change the change in navigation state over each pseudo-independent window is performed independently for each window, without requiring provision of an initial state for one window from the preceding window;

wherein initial velocity and gravity vector in a device body frame states are unknown and are not passed to subsequent windows as input; and wherein a regressor, optionally a neural network or a genetic algorithm, is used to estimate some representation of the initial velocity and the gravity vector implicitly encoded in latent features that the regressor extracts from the inertial data.

22. The mobile device of claim 21 wherein the mobile device is arranged to perform the method of claim 1.

23. The mobile device of claim 21 wherein the processing circuitry is arranged to generate some or all of the processing of segmentation, estimation and summing of the inertial data by transmitting data to a remote processing circuitry so that some or all of the processing is performed remotely.

* * * * *